US 6,697,314 B2

(12) United States Patent
Anzai et al.

(10) Patent No.: US 6,697,314 B2
(45) Date of Patent: Feb. 24, 2004

(54) INFORMATION REPRODUCING APPARATUS FOR REPRODUCING INFORMATION FROM AN INFORMATION STORAGE MEDIUM IN WHICH A STORAGE AREA IS DIVIDED INTO PHYSICAL SECTORS

(75) Inventors: Ichiro Anzai, Kawasaki (JP); Kiyotaka Fukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 420 days.

(21) Appl. No.: 09/750,932

(22) Filed: Dec. 28, 2000

(65) Prior Publication Data

US 2002/0006099 A1 Jan. 17, 2002

(30) Foreign Application Priority Data

Jul. 13, 2000 (JP) ........................................ 2000-213158

(51) Int. Cl.$^7$ ................................................. G11B 7/00
(52) U.S. Cl. .................................. 369/59.26; 369/53.21
(58) Field of Search ................ 714/758, 53; 369/47.34, 369/47.32, 53.15, 84, 59.26, 53.32, 53.21

(56) References Cited

U.S. PATENT DOCUMENTS 6,151,247 A * 11/2000 Estakhri et al. ........ 365/185.11
6,467,060 B1 * 10/2002 Malakapalli et al. ....... 714/758

FOREIGN PATENT DOCUMENTS

| JP | 4-24823 A | 1/1992 |
|---|---|---|
| JP | 08-123623 | 5/1996 |
| JP | 11-024848 | 1/1999 |

* cited by examiner

Primary Examiner—Nabil Hindi
(74) Attorney, Agent, or Firm—Greer, Burns & Crain, Ltd.

(57) ABSTRACT

There is disclosed an information reproducing apparatus and an information recording apparatus in which information transfer is possible by an information amount unit different from a sector unit, so that a burden on a host apparatus is lightened, waste of transfer time is avoided, and information protection level is raised. In a magnetooptic disk drive 10 which serves as both the information reproducing apparatus and the information recording apparatus, non-sector unit information is designated as reproducing information, information for the integer number of sectors including the non-sector unit information is reproduced from a magnetooptic disk 20, and only the non-sector unit information is outputted to a host computer 30. Moreover, the non-sector unit information is received as recording information from the host computer 30, the information for the integer number of sectors is reproduced from the integer number of sectors including an area in which the non-sector unit information is to be recorded, a part of the information for the integer number of sectors is replaced with the non-sector unit information, and the partially replaced information for the integer number of sectors is recorded in the magnetooptic disk 20.

13 Claims, 24 Drawing Sheets

INFORMATION REPRODUCING APPARATUS FOR REPRODUCING INFORMATION FROM AN INFORMATION STORAGE MEDIUM IN WHICH A STORAGE AREA IS DIVIDED INTO PHYSICAL SECTORS

BACKGROUND OF THE INVENTION i) Field of the Invention

The present invention relates to an information reproducing apparatus for reproducing information from an information storage medium and an information recording apparatus for recording the information in the information storage medium.

ii) Description of Related Art

An information recording apparatus for recording information in information storage mediums such as DVD, CD and magnetic disk has been heretofore known. In general, such information recording apparatus also serves as an information reproducing apparatus for reproducing the information from the information storage medium. Moreover, the information recording apparatus or the information reproducing apparatus is connected to or incorporated in host systems such as a personal computer and a player CPU as a storage apparatus of the host system, and utilized in a broad field. These information recording apparatus and information reproducing apparatus perform information reproducing and information recording with respect to the information storage medium in accordance with an instruction from the host system.

In general, the information storage medium is subjected to a physical format, and a recording area is divided into physical sectors. A sector head is constituted to be able to be recognized by a pit or a magnetic mark, and one sector can be said to be a unity for bytes by which drives such as the information recording apparatus and information reproducing apparatus can efficiently perform the information reproducing and information recording. In general, one sector is constituted of the number of bytes which is integer times the minimum number of bytes processable by the host system, for example, 512 B (bytes), 1024 B (bytes), 2048 B (bytes), or the like. Moreover, the information recorded in the information storage medium or the information reproduced from the information storage medium is usually transferred by a sector unit between the host system and the information reproducing apparatus.

Additionally, the amount of the information whose reproducing or recording is required by the host system is not limited to the information amount being an integer times a sector capacity, and the reproducing and recording are necessary with respect to th information of the information amount corresponding to an application program. Therefore in a conventional art, when information transfer is performed between the host system and the information reproducing apparatus, the host system obtains the amount of the information to be transferred by setting the amount to be equal to the information amount of the sector unit, and a burden on the host system is large.

Moreover, in order to set the information amount unit during information transfer to be equal to the sector unit, in addition to the information whose reproducing or recording is required by the host system, unnecessary information also needs to be transferred, and waste of a transfer time occurs.

Furthermore, for an information storage medium in which personal security information and the like are stored, it is unsafe from a standpoint of information protection to reproduce and transfer even the security information unnecessary for the host system.

From these situations, the information reproducing apparatus and information recording apparatus in which information transfer is possible by the information amount unit different from the sector unit have been demanded, but such information reproducing apparatus and information recording apparatus have not been realized.

SUMMARY OF THE INVENTION

In consideration of the aforementioned situations, an object of the present invention is to provide an information reproducing apparatus and an information recording apparatus in which information transfer is possible by an information amount unit different from a sector unit. By realizing such information reproducing apparatus and information recording apparatus, it is possible to lighten a burden on a host system, avoid a waste of a transfer time, or to raise an information protection level.

To achieve the aforementioned object according to the present invention there is provided an information reproducing apparatus for reproducing information from an information storage medium in which a storage area is divided into physical sectors as minimum units for performing information recording and information reproducing, the apparatus comprising:

an information designating reception section in which non-sector unit information constituted by a non-sector unit of an information amount different from the information amount for one sector is designated as the information to be reproduced from the information storage medium;

a reproducing section for reproducing the information for the integer number of sectors including the non-sector unit information designated by the information designating reception section from the information storage medium; and an output section for extracting and outputting the non-sector unit information designated by the information designating reception section from the information for the integer number of sectors reproduced by the reproducing section.

Moreover, to achieve the aforementioned object according to the present invention there is provided an information recording apparatus for recording information in an information storage medium in which a storage area is divided into physical sectors as minimum units for performing information recording and information reproducing, the apparatus comprising:

an information reception section in which non-sector unit information constituted by a non-sector unit of an information amount different from the information amount for one sector is received as the information to be recorded in the information storage medium;

a reproducing section for reproducing the information for the integer number of sectors stored in the areas for the integer number of sectors including a recording area in which the non-sector unit information received by the information reception section is recorded on the information storage medium;

an information replacement section for replacing the information reproduced from the recording area among the information for the integer number of sectors reproduced by the reproducing section with the non-sector unit information received by the information reception section; and a recording section for recording the information for the integer number of sectors which is partially replaced by the information replacement section in the areas for the integer number of sectors in which the information is reproduced by the reproducing section.

Here, when the information amount for one sector is, for example, 512 bytes, as the non-sector unit, for example, 50 bytes, 200 bytes, 600 bytes, and the like are considered, and as the information amount of the non-sector unit information, for example, 150 bytes corresponding to three 50 bytes, 800 bytes corresponding to four 200 bytes, and the like are considered.

According to the information reproducing apparatus of the present invention, the non-sector unit information is designated as reproducing information, and the designated non-sector unit information is outputted. Moreover, according to the information recording apparatus of the present invention, the non-sector unit information is received as recording information, and the received non-sector unit information is recorded in the information storage medium.

Therefore, between the host system for instructing the information reproducing apparatus or the information recording apparatus to reproduce or record the information and the information reproducing apparatus or the information recording apparatus of the present invention, the reproducing information or the recording information required by the host system can be transferred by the information amount unit which is different from the sector unit. Therefore, in the host system, a trouble of setting the amount of the information to be transferred to be equal to the information amount of the sector unit becomes unnecessary, and a burden on the host system is light. Moreover, transfer of unnecessary information is avoided. Furthermore, for the information storage medium, with the information storage medium in which personal security information is stored, an information protection level is raised.

Preferably, in the information recording apparatus of the present invention,

"the information reception section receives each of the non-sector unit information and sector unit information constituted by the sector unit of the information amount for one sector as the information to be recorded in the information storage medium, and the information recording apparatus comprises: a nonvolatile memory for storing the information for the integer number of sectors when the information reception section receives the non-sector unit information and the information for the integer number of sectors including the non-sector unit information is recorded in the information storage medium; and a volatile memory for storing the sector unit information when the information reception section receives the sector unit information and the sector unit information is recorded in the information storage medium."

Here, when the information amount for one sector is, for example, 512 bytes, the amount of the sector unit information is, for example, 2560 bytes corresponding to five 512 bytes.

In order to avoid information disappearance when a write error or an inadvertent power disconnection occurs during information recording, it is preferable to dispose the nonvolatile memory for storing the information for the integer number of sectors recorded in the information storage medium by the recording section. However, since the volatile memory is larger in capacity and higher in speed than the nonvolatile memory, by selectively using the memory in recording the sector unit information and in recording the non-sector unit information, information disappearance is avoided, and a high-speed information recording apparatus can be realized.

Moreover, in a case in which the information recording apparatus of the present invention operates as if it were a write-once information recording apparatus, "the information recording apparatus comprises an area designation section for designating an area, as the area for recording the non-sector unit information received by the information reception section on the information storage medium, following an end of the latest information received by the information reception section and recorded on the information storage medium before the non-sector unit information, the reproducing section reproduces the information stored in the integer number of sectors including the area designated by the area designation section, and the replacement section replaces the information reproduced from the area designated by the area designation section among the information for the integer number of sectors reproduced by the reproducing section with the non-sector unit information received by the information reception section."

The information recording apparatus of the present invention operates as if it were the write-once information recording apparatus, and therefore the write-once information recording apparatus is realized in which a storage capacity of the information storage medium can be utilized without being wasted.

DETAILED DESCRIPTION OF THE PREFERRED EMBODIMENTS

An embodiment of the present invention will be described hereinafter. In the following description, terms "information" and "data" are used without being particularly distinguished from each other in some cases.

Figure 1:
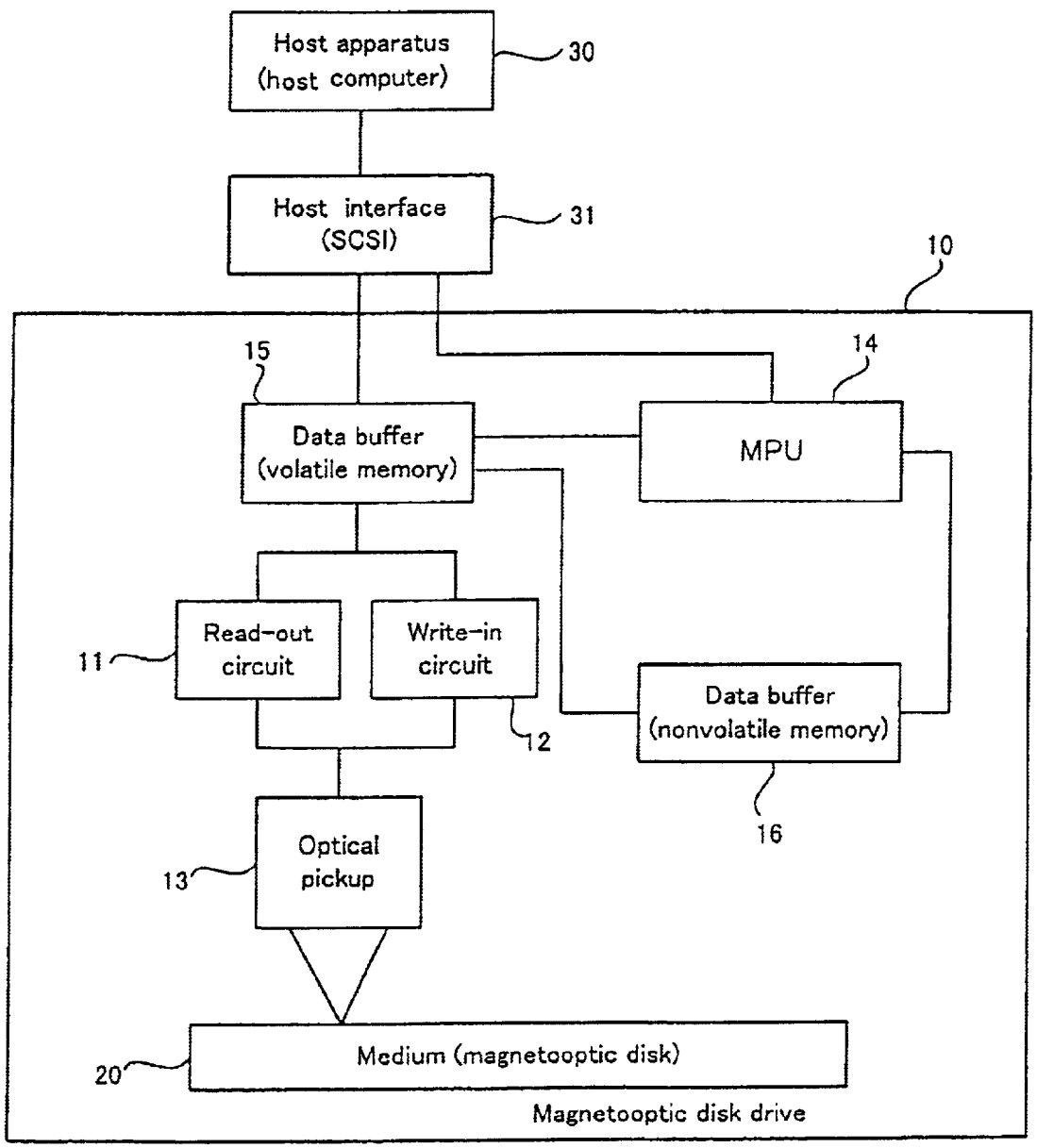
FIG. 1 is a diagram showing one embodiment of the present invention.

FIG. 1 is a diagram showing one embodiment of the present invention.

FIG. 1 shows a magnetooptic disk drive 10 which serves as both one embodiment of an information reproducing apparatus of the present invention and one embodiment of an information recording apparatus of the present invention. The magnetooptic disk drive 10 holds a magnetooptic disk 20 as one example of an information storage medium referred to in the present invention inside, and performs information recording and information reproducing with respect to the magnetooptic disk 20. Moreover, the magnetooptic disk drive 10 is connected to a host computer 30 via an SCSI type host interface 31, and receives instructions of information reproducing and information recording from the host computer 30.

The magnetooptic disk drive 10 is provided with a read-out circuit 11, a write-in circuit 12, and an optical pickup 13.

The optical pickup 13 incorporates a laser diode, and this optical pickup 13 is controlled with respect to laser light quantity, light emitting timing, and the like by the read-out circuit 11 and write-in circuit 12 to irradiate the magnetooptic disk 20 with a laser light.

The write-in circuit 12 is one example of a recording section referred to in the present invention, uses the irradiation laser light of the optical pickup 13 and writes a predetermined mark in the magnetooptic disk 20 to perform information recording.

The read-out circuit 11 is one example of a reproducing section referred to in the present invention, uses the irradiation laser light of the optical pickup 13 and reads the mark written in the magnetooptic disk 20 to perform information reproducing.

Moreover, the magnetooptic disk drive 10 is also provided with a microprocessor unit (MPU) 14, a volatile memory 15, and a nonvolatile memory 16.

The microprocessor unit 14 controls each section operation of the magnetooptic disk drive 10, and operates as an information designating reception section, an area designation section or an information replacement section referred to in the present invention. In the present embodiment, the microprocessor unit 14 executes a firmware program based on an instruction of the host computer 30, and an operation peculiar to the present invention is realized. However, in the present invention, by a control program other than the firmware program, or a program stored in a memory or a medium particularly to secure security, the operation peculiar to the present invention may also be realized.

The volatile memory 15 and nonvolatile memory 16 are utilized as a data buffer for storing the information reproduced from the magnetooptic disk 20 by the read-out circuit 11, information recorded in the magnetooptic disk 20 by the write-in circuit 12, and the like. Moreover, the memories are also utilized as an information reception section and output section referred to in the present invention, receives the information to be recorded in the magnetooptic disk 20 from the host computer 30, and outputs the information requested to be reproduced by the host computer 30 to the host computer 30. Additionally, mainly an operation in which the nonvolatile memory 16 is utilized as the data buffer or the like will be described hereinafter.

Figure 2:
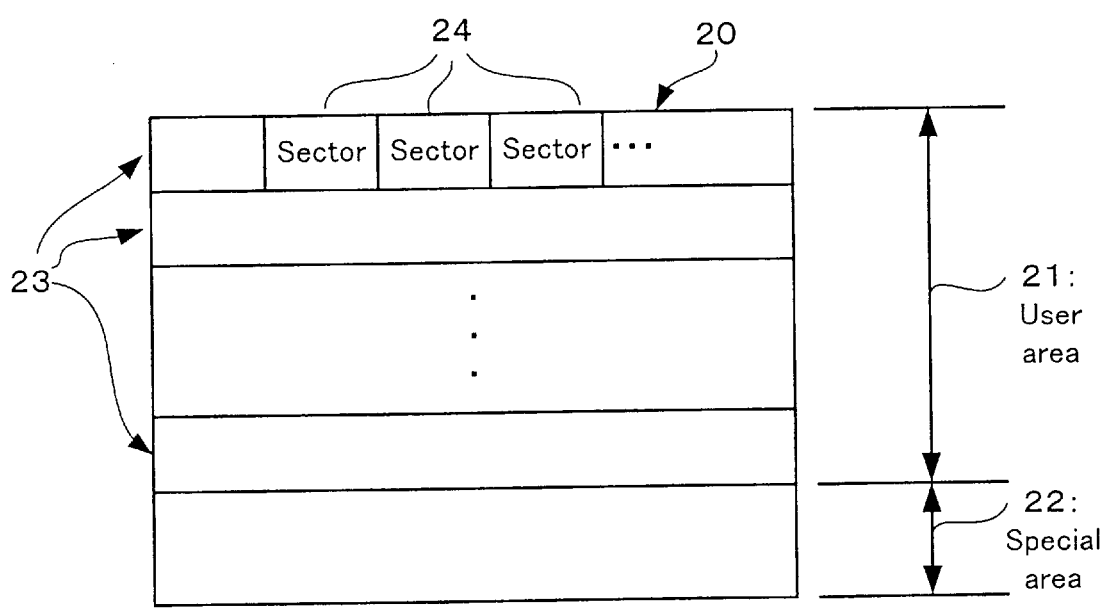
FIG. 2 is a schematic view showing a structure of a magnetooptic disk.

FIG. 2 is a schematic view showing a structure of the magnetooptic disk.

The magnetooptic disk 20 is provided with a user area 21 recognized as a storage area by the host computer, and a special area 22 hidden against the host computer and managed by the magnetooptic disk drive. Prepared in this special area 22 are a number area in which a medium identification number for identifying individual magnetooptic disks 20 is recorded, a test area in which the predetermined mark is written on trial, and the like.

The user area 21 is divided into a plurality of tracks 23, and the respective tracks 23 are further divided into a plurality of sectors 24. The track 23 is linearly shown in FIG. 2, but is actually disposed in a shape of a concentric circle. In boundaries of the respective sectors 24, a pit mark is disposed as a physical hole in a substrate of the magnetooptic disk 20, and a storage capacity of each sector is predetermined.

Here, after describing a basic operation of the magnetooptic disk drive 10 shown in FIG. 1, the operation of the magnetooptic disk drive 10 will be described based on a concrete use mode. In the following description, for convenience of description, it is assumed that the magnetooptic disk drive 10 is instructed from the host computer 30 to reproduce or record the information with an information amount (e.g., 50 bytes) less than the amount for one sector (e.g., 512 bytes). However, even when the reproducing or recording is instructed with respect to the information of an amount (e.g., 512×integer number+50 bytes) more than the information amount for one sector, the magnetooptic disk drive 10 can appropriately execute the information reproducing or the information recording by an operation substantially similar to the operation described hereinafter.

Figure 3:
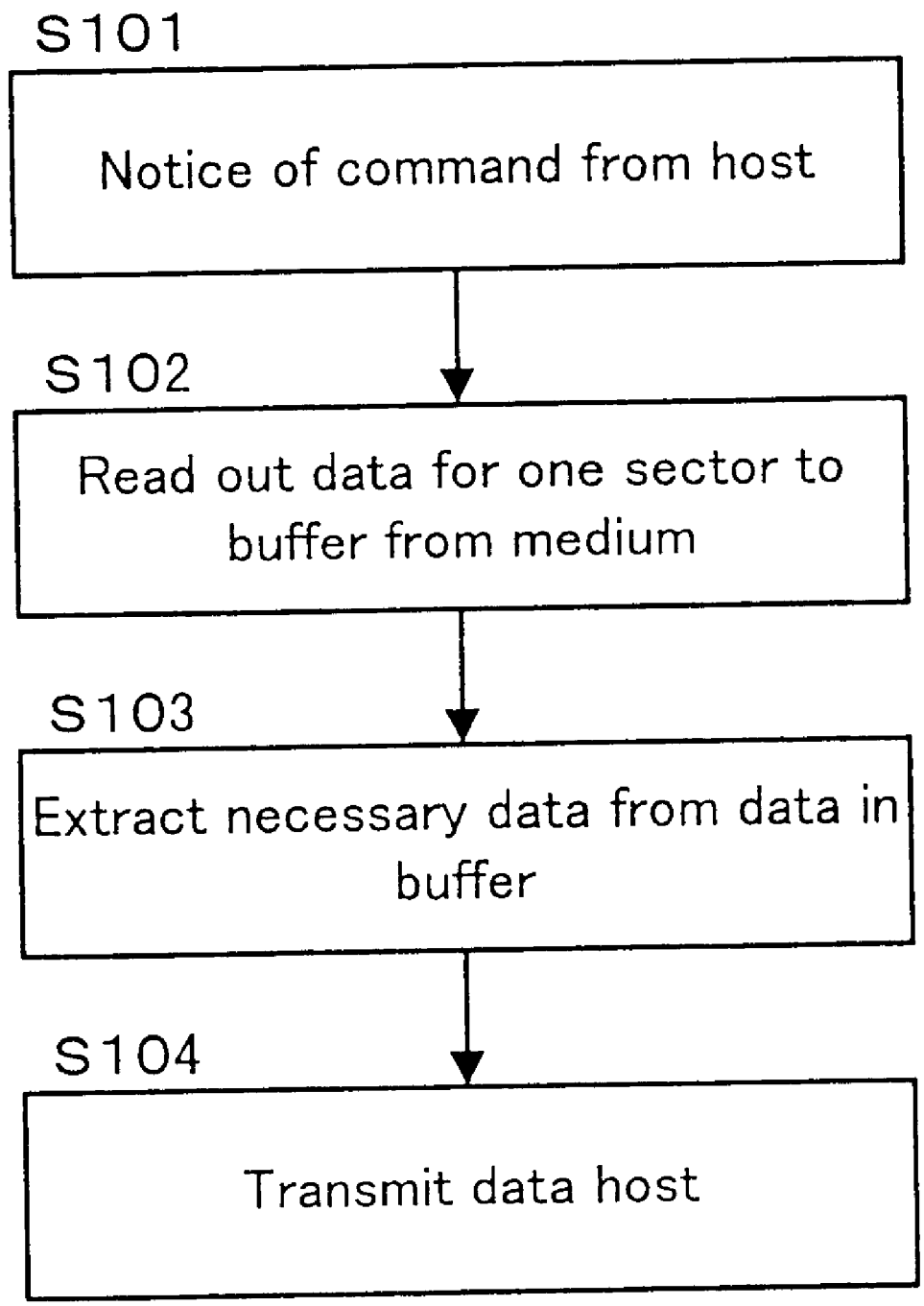
FIG. 3 is a flowchart showing a basic operation of information reproducing by a magnetooptic disk drive.
Figure 4:
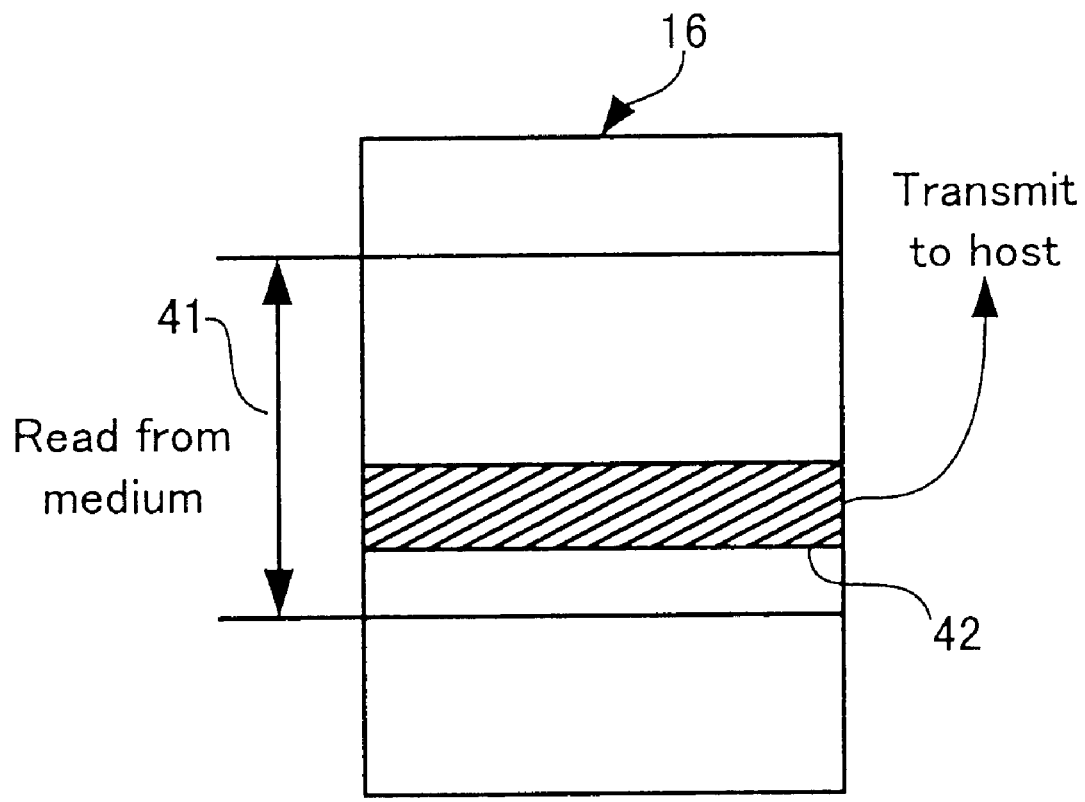
FIG. 4 is a diagram showing data stored in a data buffer during information reproducing.

FIG. 3 is a flowchart showing the basic operation of information reproducing by the magnetooptic disk drive, and FIG. 4 is a diagram showing data stored in the data buffer during information reproducing. The basic operation of information reproducing shown by the flowchart of FIG. 3 will be described hereinafter with reference to FIG. 4.

As shown in the flowchart of FIG. 3, when a command for instructing information reproducing is given from the host computer (step S101), the basic operation of information reproducing is started, and data 41 for one sector is read out to the data buffer 16 from a medium, that is, the magnetooptic disk (step S102). Subsequently, data 42 desired by the host computer is extracted from the data 41 for one sector (step S103), and the extracted data 42 is transmitted to the host computer (step S104).

Figure 5:
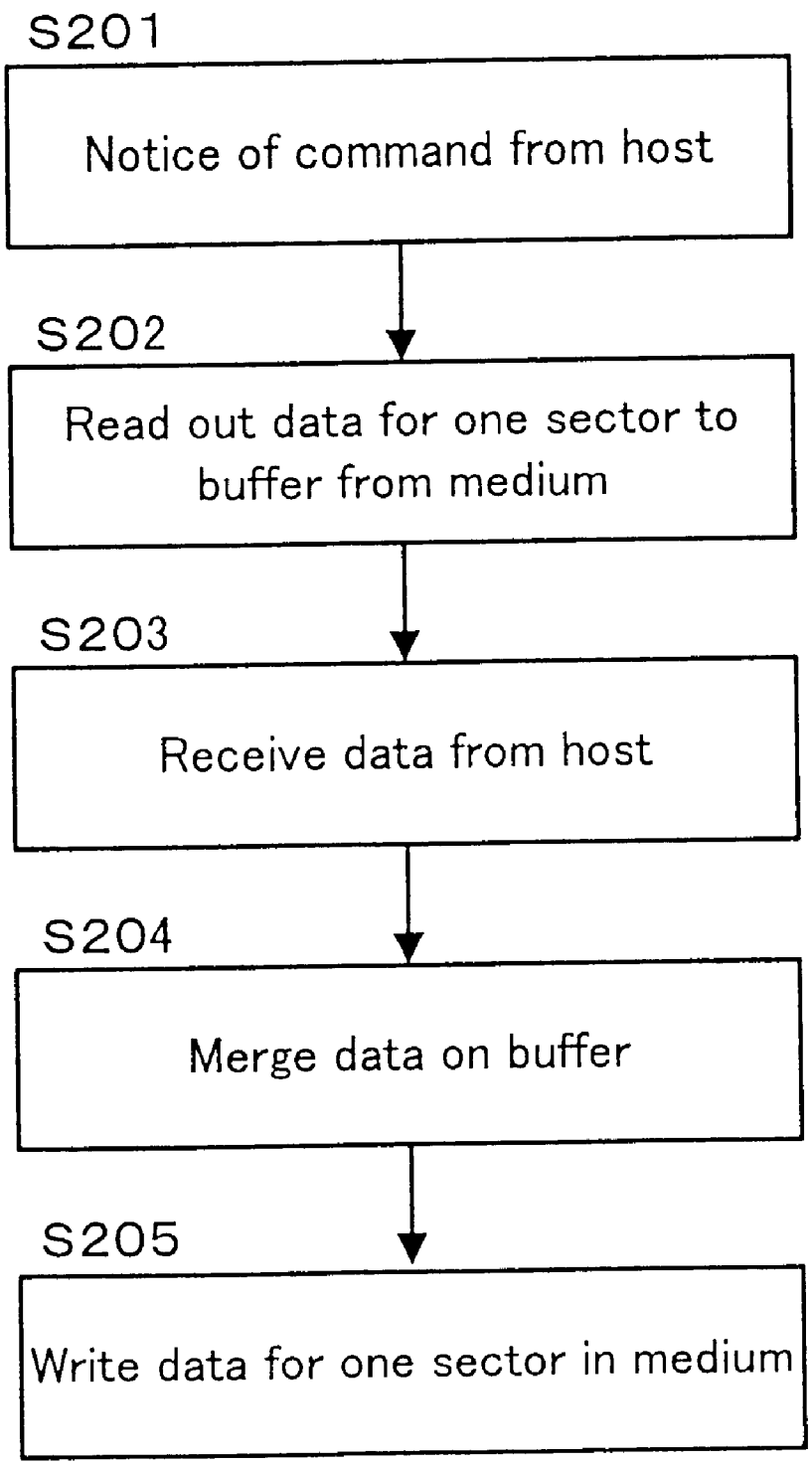
FIG. 5 is a flowchart showing the basic operation of information recording by the magnetooptic disk drive.
Figure 6:
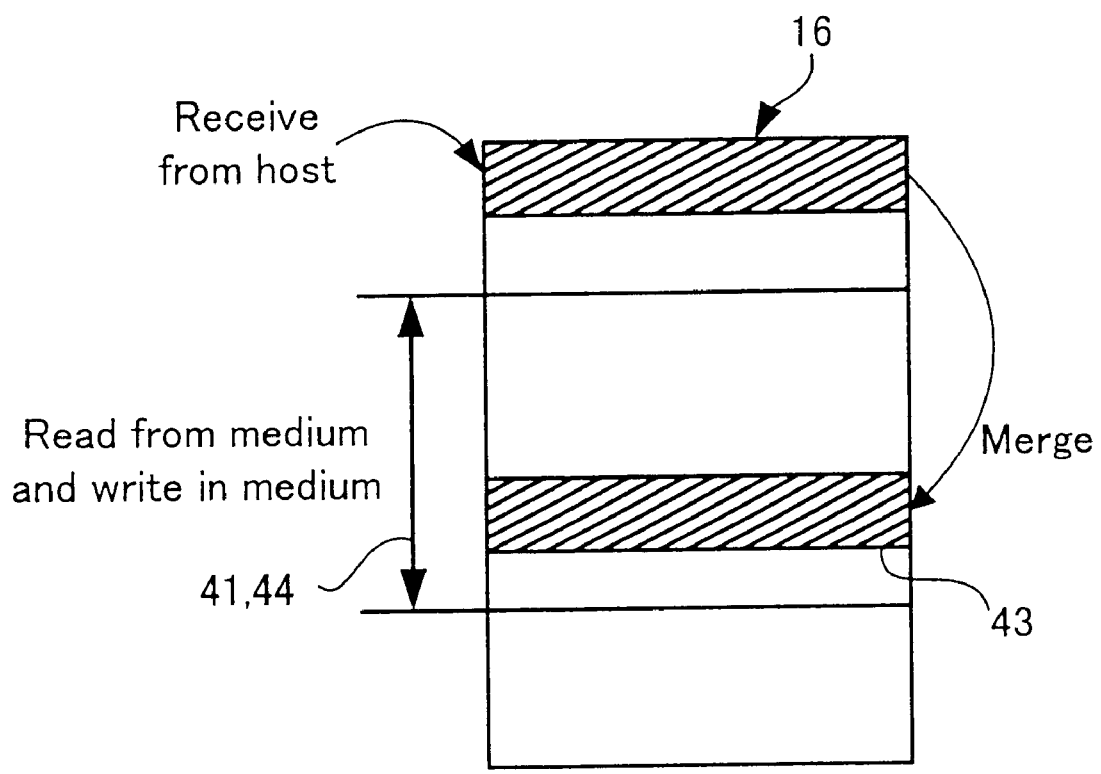
FIG. 6 is a diagram showing the data stored in the data buffer during information recording.

FIG. 5 is a flowchart showing the basic operation of information recording by the magnetooptic disk drive, and FIG. 6 is a diagram showing the data stored in the data buffer during information recording. The basic operation of information recording shown in the flowchart of FIG. 5 will be described hereinafter with reference to FIG. 6.

As shown in the flowchart of FIG. 5, when a command for instructing information recording is given from the host computer (step S201), the basic operation of information recording is started, and the data 41 for one sector is read out to the data buffer 16 from a sector in which data is recorded on the medium, that is, the magnetooptic disk (step S202). Subsequently, data 43 to be recorded on in the magnetooptic disk is received from the host computer (step S203), and the data 41 read from the magnetooptic disk is merged with the data 43 received from the host computer on the data buffer (step S204). Data 44 for one sector generated by merging two data 41, 43 in this manner is written in the sector from which the data is read out in the step S202 among the sectors of the magnetooptic disk (step S205).

By the operation shown in the flowcharts of FIGS. 3 and 5, information transfer by a non-sector unit is possible between the host computer and the magnetooptic disk drive.

Figure 7:
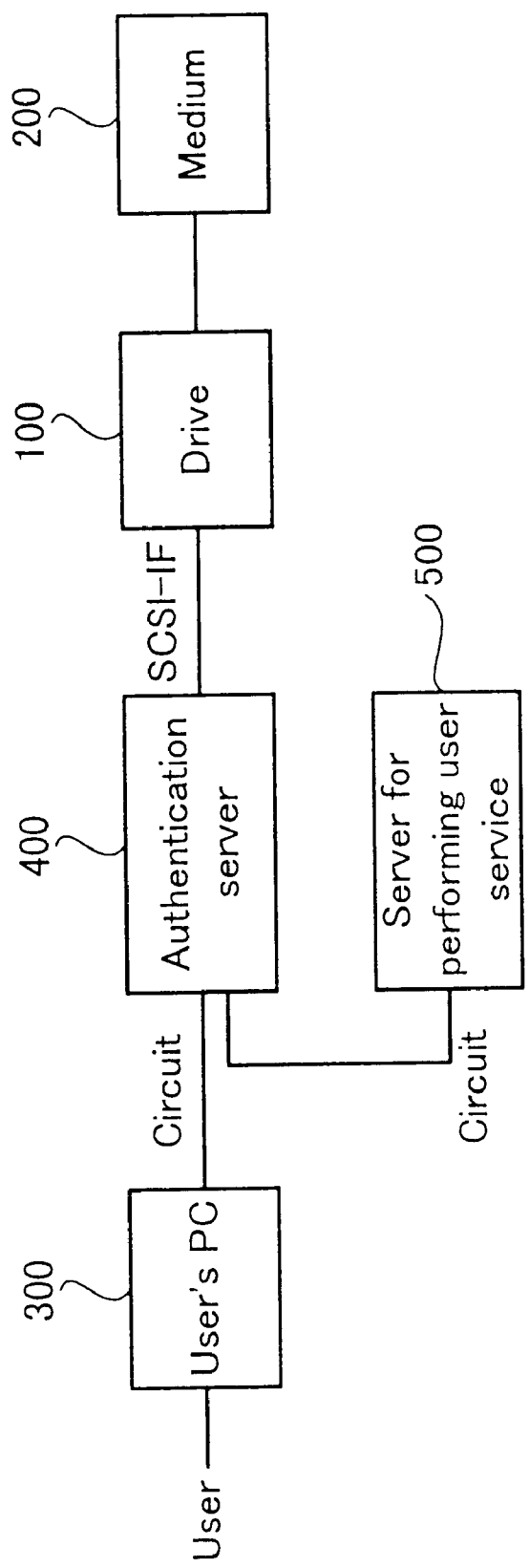
FIG. 7 is a diagram showing one example of a concrete use mode of the magnetooptic disk drive.

FIG. 7 is a diagram showing one example of a concrete use mode of the magnetooptic disk drive 10 shown in FIG. 1.

FIG. 7 shows a service presenting system provided with a user authentication function.

In the service presenting system, a drive 100 equivalent to the magnetooptic disk drive 10 shown in FIG. 1 is used as an apparatus for performing information reproducing and information recording with respect to an information storage medium 200 in which user's personal information is stored.

This service presenting system is constituted by connecting a personal computer 300 operated by a user, an authentication server 400 for performing user authentication, and a service server 500 for presenting a service in response to a request from the personal computer 300 to one another via a communication circuit. Moreover, the authentication server 400 is connected to the drive 100 via the SCSI type interface, and the authentication server 400 operates as the aforementioned host computer.

Figure 8:
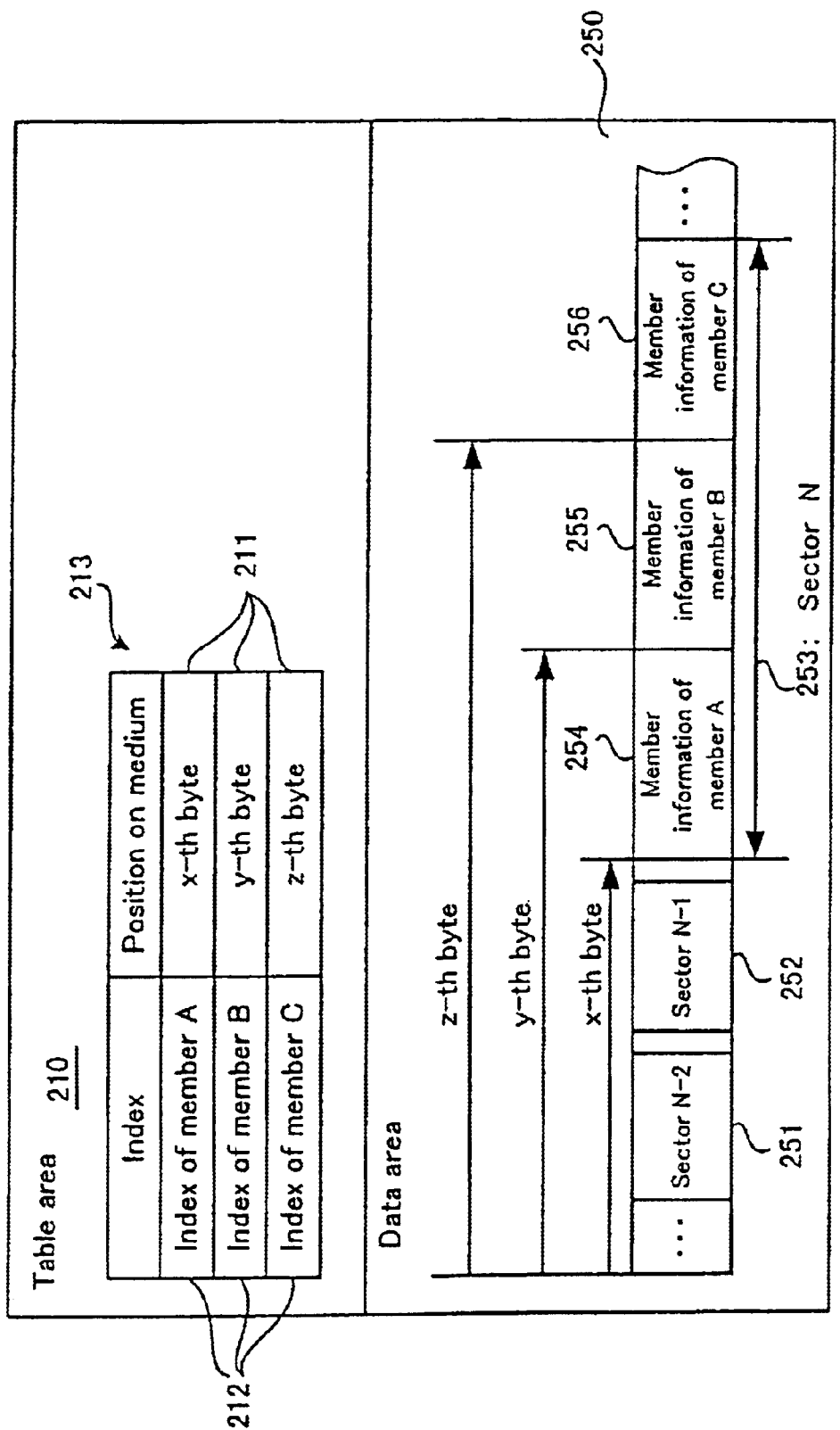
FIG. 8 is a diagram showing a structure of a storage area of an information storage medium.

FIG. 8 is a diagram showing a structure of a storage area of the information storage medium 200 shown in FIG. 7.

The information storage medium 200 is provided with a table area 210 and a data area 250. The data area 250 is divided into physical sectors, and FIG. 8 illustrates N-$2^{nd}$ sector 251, N-$1^{st}$ sector 252, and N-th sector 253. Moreover, in the data area 250, member information of respective members entitled to utilize the service presenting system shown in FIG. 7 is stored, and here as one example, in the N-th sector 253, member information 254, 255, 256 of respective members A, B, and C are stored.

Moreover, in the table area 210 a position information 211 indicating a position in which the member information is stored, and a table 213 in which member indexes 212 for distinguishing members from one another are associated with the respective members is stored too. The respective member information 254, 255, 256 of the members A, B, and C are stored in x-th byte, y-th byte, and z-th byte counted from a head of data area 250, respectively.

Figure 9:
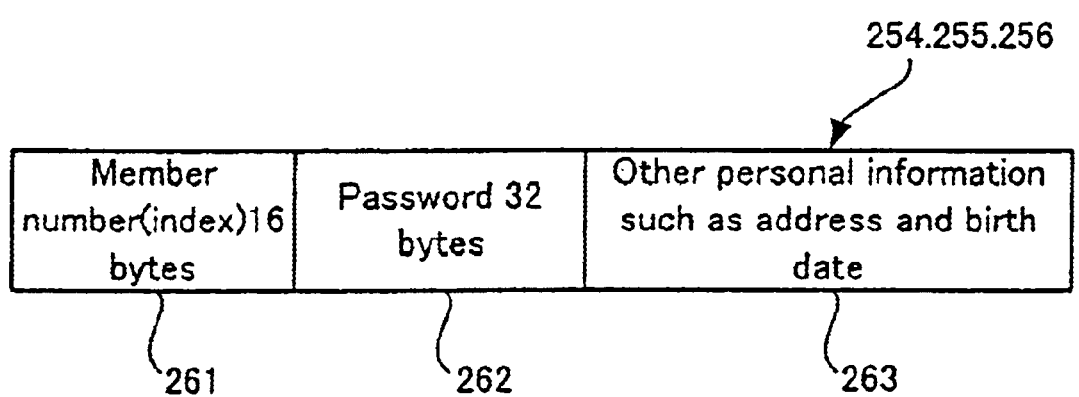
FIG. 9 is a diagram showing one example of a constitution of member information.

FIG. 9 is a diagram showing one example of a constitution of the member information.

Here, each of the member information 254, 255, 256 is constituted of 16 byte data 261 indicating the member index, 32 byte data 262 indicate a password, and data 263 indicating personal information such as an address and a birth date.

When the information storage medium stores security information in this manner, reading/writing and updating of the security information with respect to the information storage medium are performed by a sector unit irrespective of a magnitude of information amount. However, in order to inhibit the information unnecessary for update or the like from being transmitted/received with the host computer, it is necessary to transmit/receive the information by a unit independent of a sector size between the host computer and the drive.

Here, between the host computer and the drive, by transmitting/receiving only the necessary information by the unit independent of the sector size, editing the information for performing read/write with respect to the medium on the drive, and performing read/write by the sector unit on the medium, the reading/writing of the information of an arbitrary size is realized as seen from the host computer.

Figure 10:
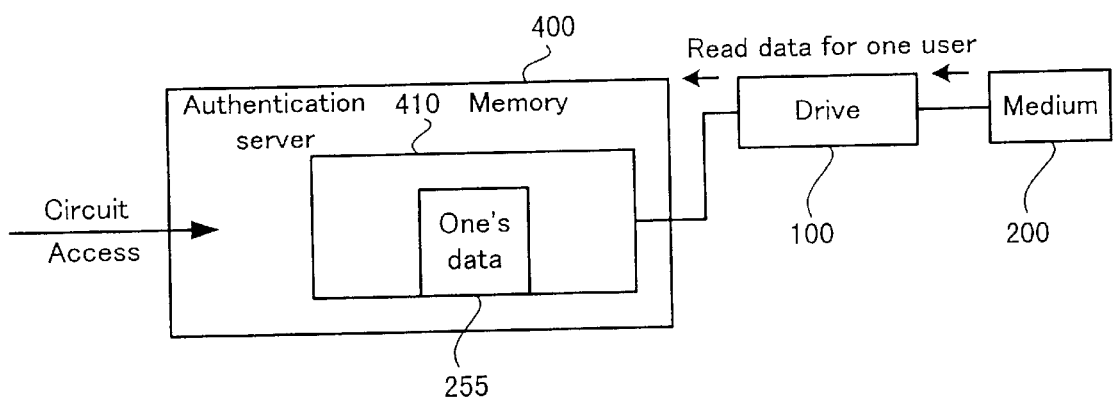
FIG. 10 is a diagram showing that the member information is read out.
Figure 11:
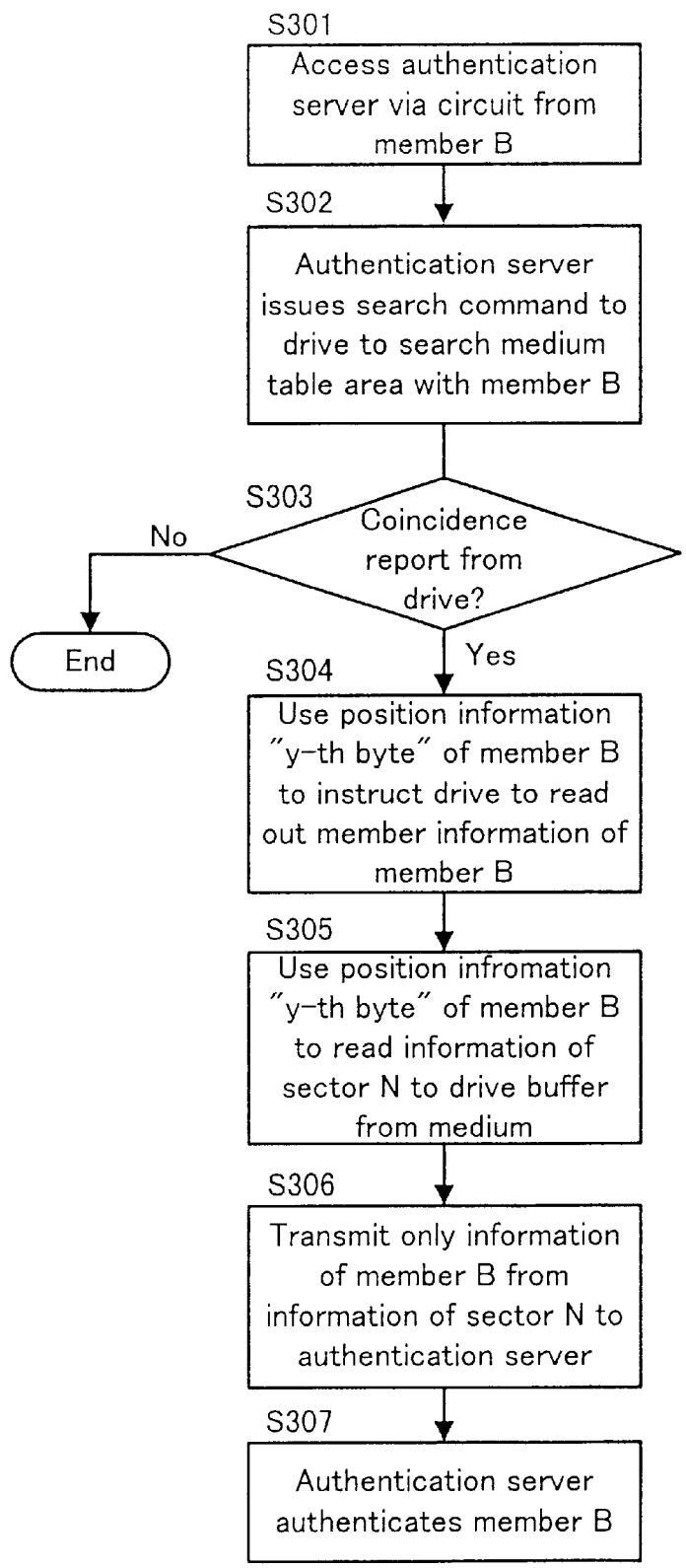
FIG. 11 is a flowchart showing an operation of reading out the member information.

FIG. 10 is a diagram showing that the member information is read out, and FIG. 11 is a flowchart showing an operation of reading out the member information. The flowchart of FIG. 11 will be described hereinafter by appropriately referring to FIG. 10. Additionally, it is assumed here that the member information of the member B is read out.

The member B is one of users shown in FIG. 7, accesses the authentication server 400 via the personal computer 300 and communication circuit, and requests authentication (step S301 of FIG. 11). The authentication server 400 allows the drive 100 to search the table area of the information storage medium 200 with the index of the member B (step S302 of FIG. 11), and ends the operation as it is on receiving a report "there is no coincident index" from the drive 100 (step S303 of FIG. 11: No).

As a result of the search by the index of the member B, on receiving a report "there is a coincident index" from the drive 100 (step S303 of FIG. 11: Yes), the authentication server 400 instructs the drive 100 to read out the member information of the member B from a position "y-th byte" indicated by the position information associated with the index of the member B (step S304 of FIG. 11).

The drive 100 instructed to read out the member information of the member B reads the respective member information 254, 255, 256 of the members A, B, and C stored in the sector 253 including the position "y-th byte" shown in FIG. 8 to the data buffer from the information storage medium 200 (step S305 of FIG. 11). Subsequently, the drive 100 extracts only the member information 255 of the member B from the member information read out to the data buffer and transmits the information to the authentication server 400 (step S306 of FIG. 11).

The authentication server 400 stores the member information 255 of the member B transmitted from the drive 100 into an incorporated memory 410, and performs authentication of the member B based on the password indicated by the member information 255 (step S307 of FIG. 11).

In this manner, since the authentication server 400 receives only the member information 255 of the member B oneself, security of the member information stored in the information storage medium 200 is high.

Figure 12A:
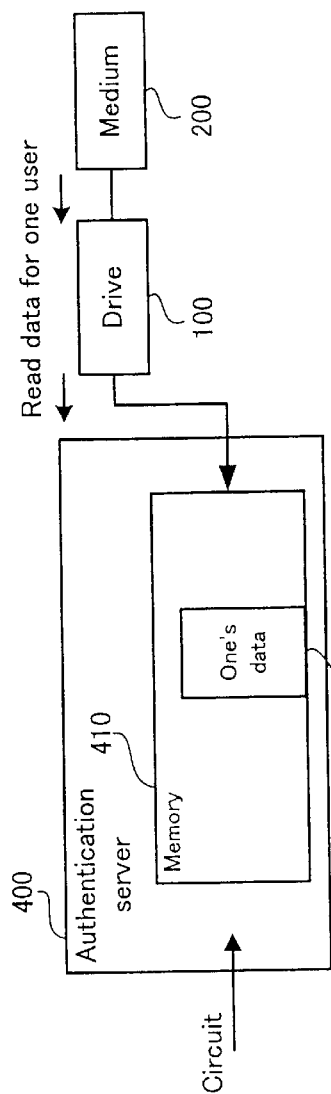
FIGS. 12A to 12C are diagrams showing that the member information is corrected.
Figure 12B:
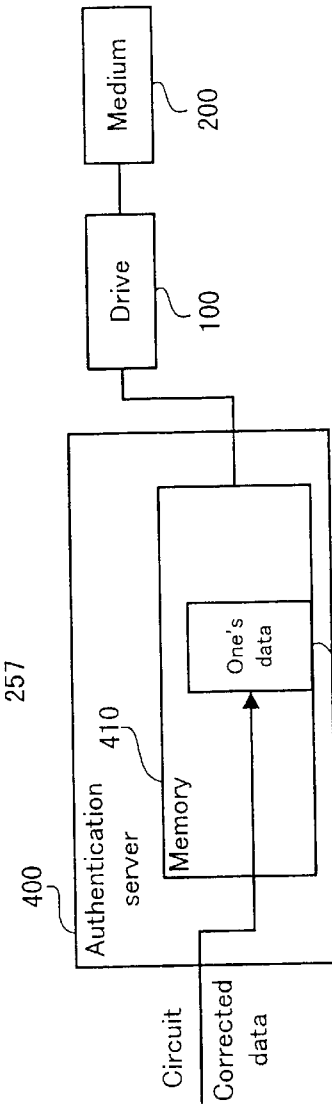
Figure 12C:
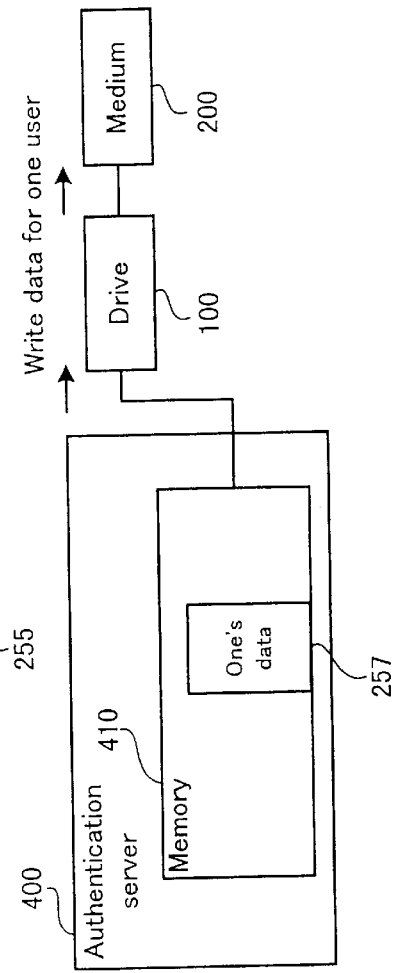
Figure 13:
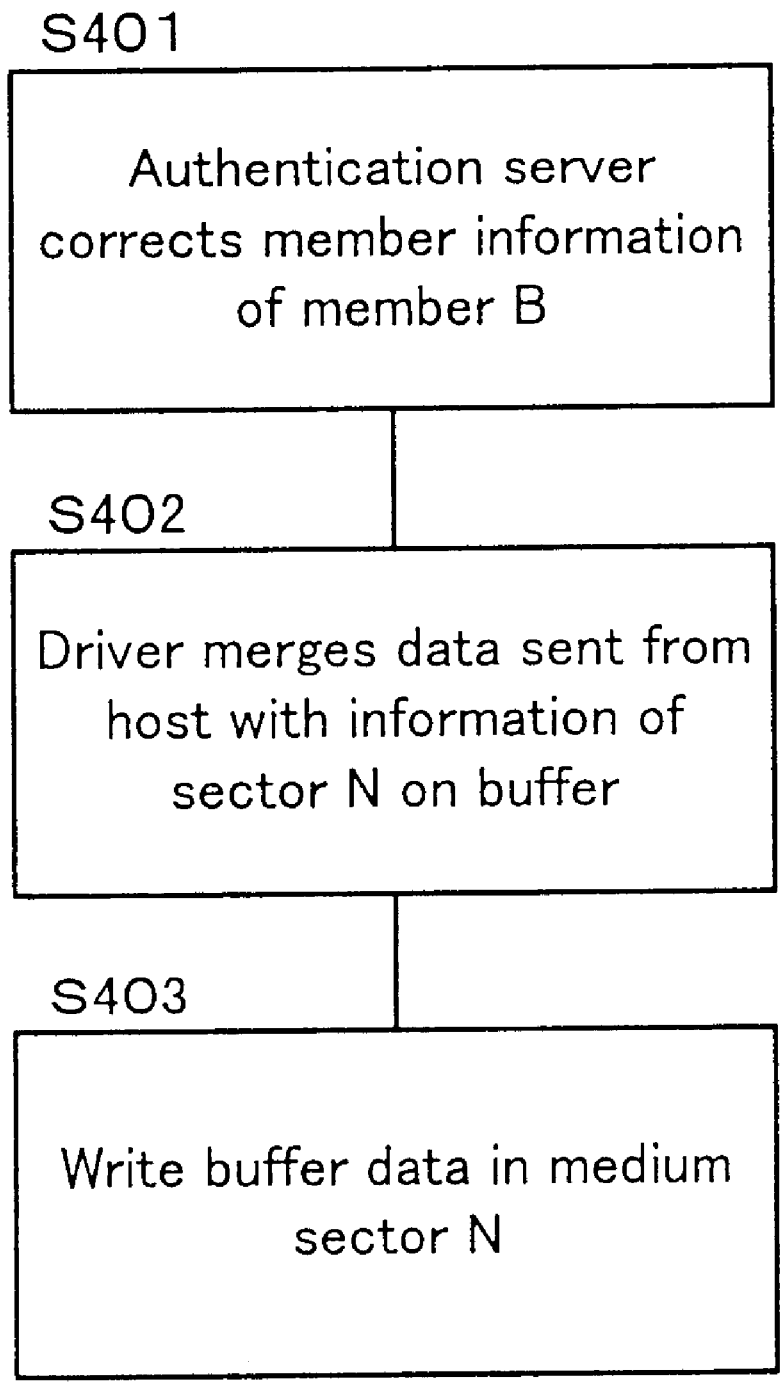
FIG. 13 is a flowchart showing an operation of correcting the member information.
Figure 14:
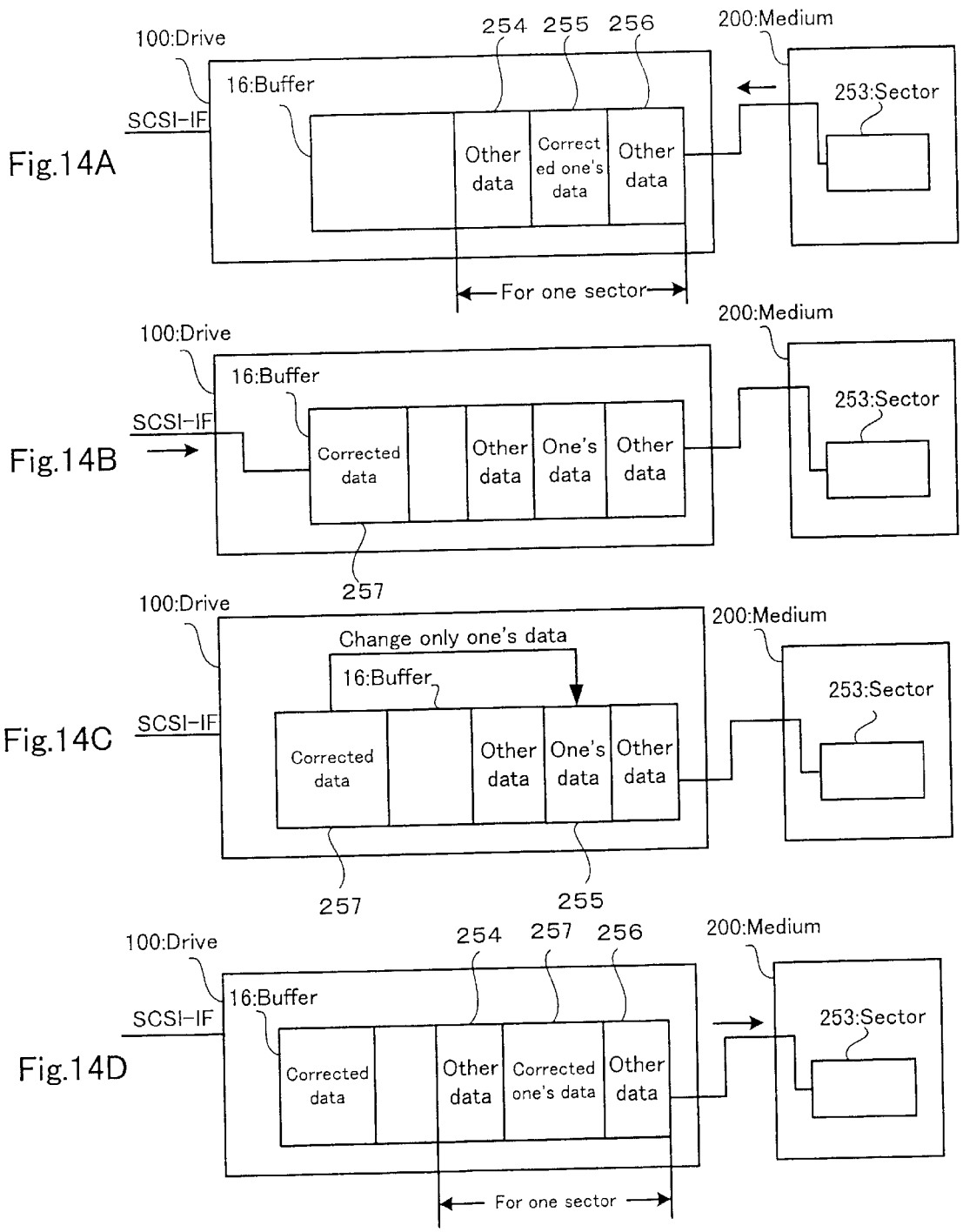
FIGS. 14A to 14D are diagrams showing details of a drive operation when the member information is corrected.

FIGS. 12A to 12C are diagrams showing that the member information is corrected, and FIG. 13 is a flowchart showing an operation of correcting the member information. The flowchart of FIG. 13 will be described hereinafter by appropriately referring to FIG. 12. Additionally, similarly as described above, the member information of the member B is corrected.

FIG. 12A shows that the authentication of the member B ends, and the member information 255 of the member B is stored in the incorporated memory 410 of the authentication server 400. Here, when the member B requests, for example, change of the address with respect to one's member information 255, the corrected data obtained by correcting the original member information 255 is sent to the authentication server 400 via the personal computer 300 and communication circuit shown in FIG. 7.

FIG. 12B shows that the corrected data is sent to the authentication server 400, and the authentication server 400 corrects the member information by replacing the original member information 255 of the member B with sent corrected data 257 (step S401 of FIG. 13).

FIG. 12C shows a state after the authentication server 400 corrects the member information of the member B, and the memory 410 stores the corrected data 257 which corresponds to the corrected member information. This corrected data 257 is transmitted to the drive 100.

As described above, when the member B is authenticated, the member information for a plurality of persons stored in the N-th sector is read out to the data buffer of the drive 100. Subsequently, the drive 100 merges the corrected member information 257 transmitted from the authentication server 400 with the member information for a plurality of persons read out to the data buffer, and data for one sector is prepared (step S402 of FIG. 13).

The drive 100 records the data for one sector prepared in this manner on the data buffer in the N-th sector of the information storage medium 200.

FIGS. 14a to 14D are diagrams showing details of a drive operation when the member information is corrected.

FIG. 14A shows that the authentication of the member B ends. As described above, in the data buffer 16 of the drive 100, the member information 254, 255, 256 for a plurality of persons are read out for one sector from the N-th sector 253 of the information storage medium 200.

FIG. 14B shows that the corrected data 257 corresponding to the corrected member information is transmitted from the authentication server, and the corrected data 257 is stored in the data buffer 16.

FIG. 14C shows that the corrected data 257 is merged with the member information 254, 255, 256 read out from the N-th sector 253 of the information storage medium 200. Only the original member information 255 of the member B corresponding to the corrected data 257 is replaced with the corrected data 257.

FIG. 14D shows that the member information has been replaced. On the data buffer 16, the data for one sector constituted of the member information 254, 257, 256 for a plurality of persons is prepared, and the drive 100 records the data for one sector in the N-th sector 253 of the information storage medium 200.

In this manner, since only the necessary member information is transmitted/received between the drive 100 and the host computer, an information protection level is high. Moreover, when it is desired only to protect the security information such as the member information, for example, by recording the security information for one person in one sector, reproducing of only the necessary security information is possible even by a conventional information reproducing apparatus. However, when the security information is recorded in the information storage medium in this recording method, the capacity of the information storage medium is remarkably wasted, and practical use properties are insufficient. On the other hand, in the present invention, the capacity of the information storage medium is effectively utilized, and the practical use properties are high.

Additionally, when the drive 100 performs information recording, write error, inadvertent power disconnection, and the like probably occur, and when such write error or the like occurs, the drive 100 fails in recording the information.

Figure 15:
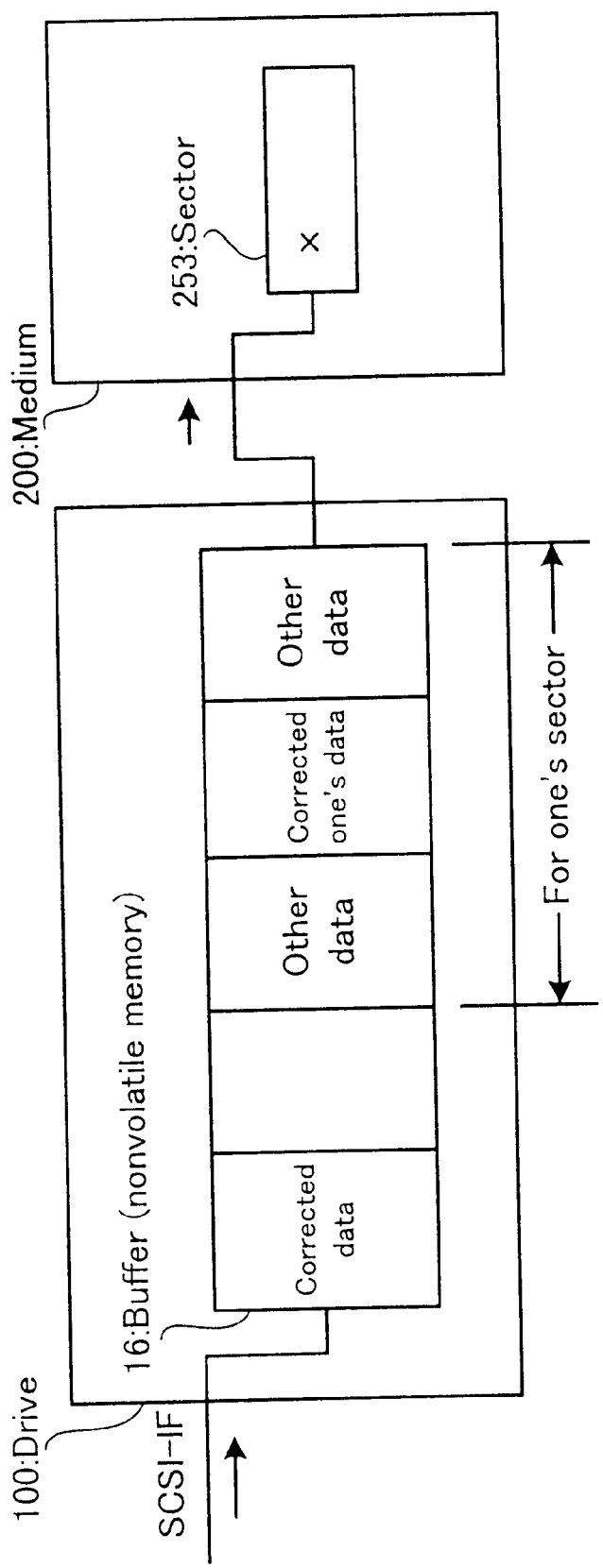
FIG. 15 is a diagram showing that a drive fails in recording the information.

FIG. 15 is a diagram showing that the drive fails in recording the information.

FIG. 15 shows that the drive 100 fails in recording the member information 254, 257, 256 shown in FIG. 14D, and the N-th sector 253 of the information storage medium 200 is unusable. When the sector 253 becomes unusable in this manner, the member information 254, 255, 256 for a plurality of persons stored in the sector 253 are lost. Since the member information 255 of the member B is an object of correction among these member information 254, 255, 256, usually backup data is stored in the authentication server or the like to prevent data disappearance. However, the member information 254, 256 of the members other than the member B are not the correction object, and become so-called traveling companions while the authentication server fails to recognize the member information. Therefore, as a practical information recording apparatus, it is preferable to apply some countermeasure against disappearance of the member information 254, 256 of the members other than the member B.

As a first countermeasure against the data disappearance, as shown in FIG. 15, it is proposed to employ a nonvolatile memory in the data buffer 16 of the drive 100.

When the data buffer 16 is a nonvolatile memory, even with inadvertent power disconnection, necessary data remains on the data buffer 16, and the data disappearance is therefore avoided. Additionally, when reproducing or recording of new member information is performed, the data on the nonvolatile memory can be erased by a predetermined command, and the memory capacity is effectively utilized.

It is effective as the countermeasure against the data disappearance to employ the nonvolatile memory in the data buffer 16 in this manner, but when the authentication server abandons the recording of the corrected data and instructs the drive 100 for another processing, the data remaining on the data buffer 16 is probably destroyed.

Therefore, except the first countermeasure, it is preferable to apply the following countermeasure against the data disappearance.

Figure 16:
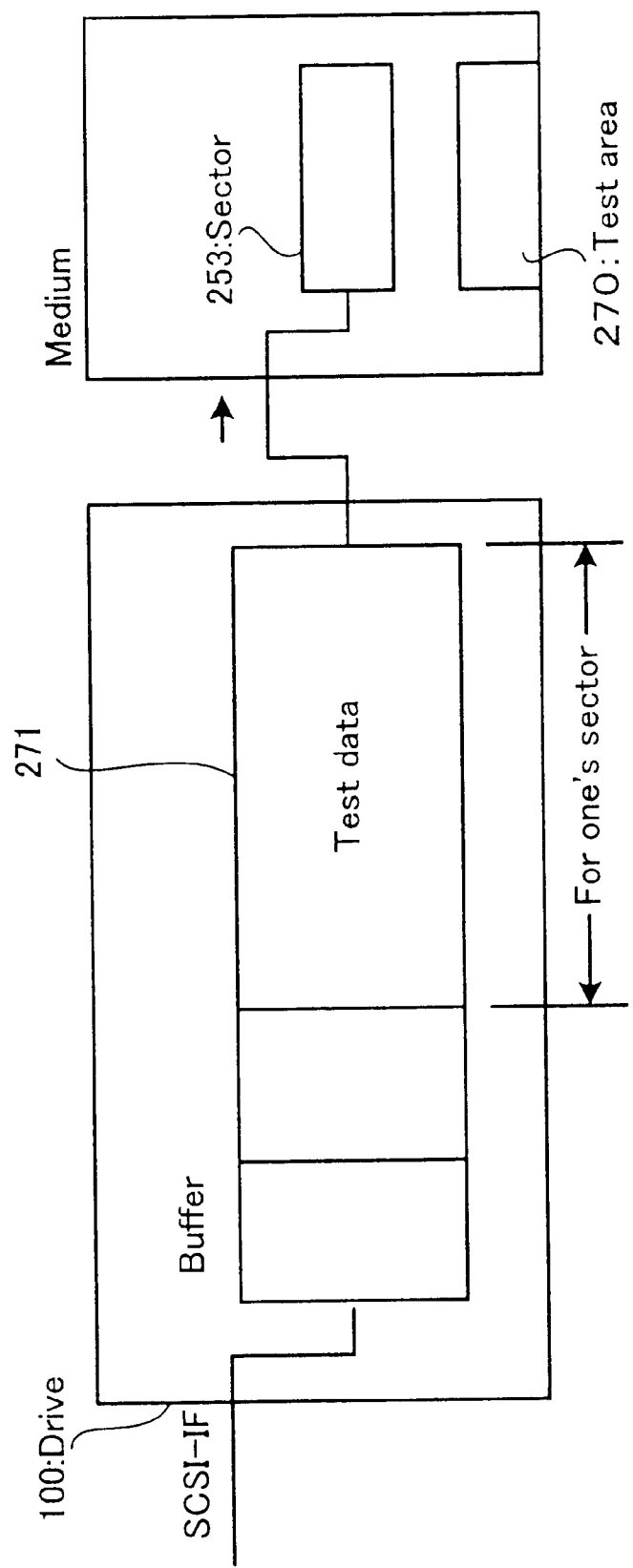
FIG. 16 is a diagram showing a second countermeasure with respect to data disappearance.

FIG. 16 is a diagram showing a second countermeasure against the data disappearance.

The second countermeasure comprises carrying out a test for writing test data 271 for one sector beforehand with respect to a test area 270 present in the special area 22 shown in FIG. 2, and turning aside the information into the tested test area 270 when the drive 100 fails in recording the information in the N-th sector 253.

By turning aside the information into the test area 270 in this manner, even when the information stored in the data buffer 16 is destroyed later, the data disappearance is avoided.

Figure 17:
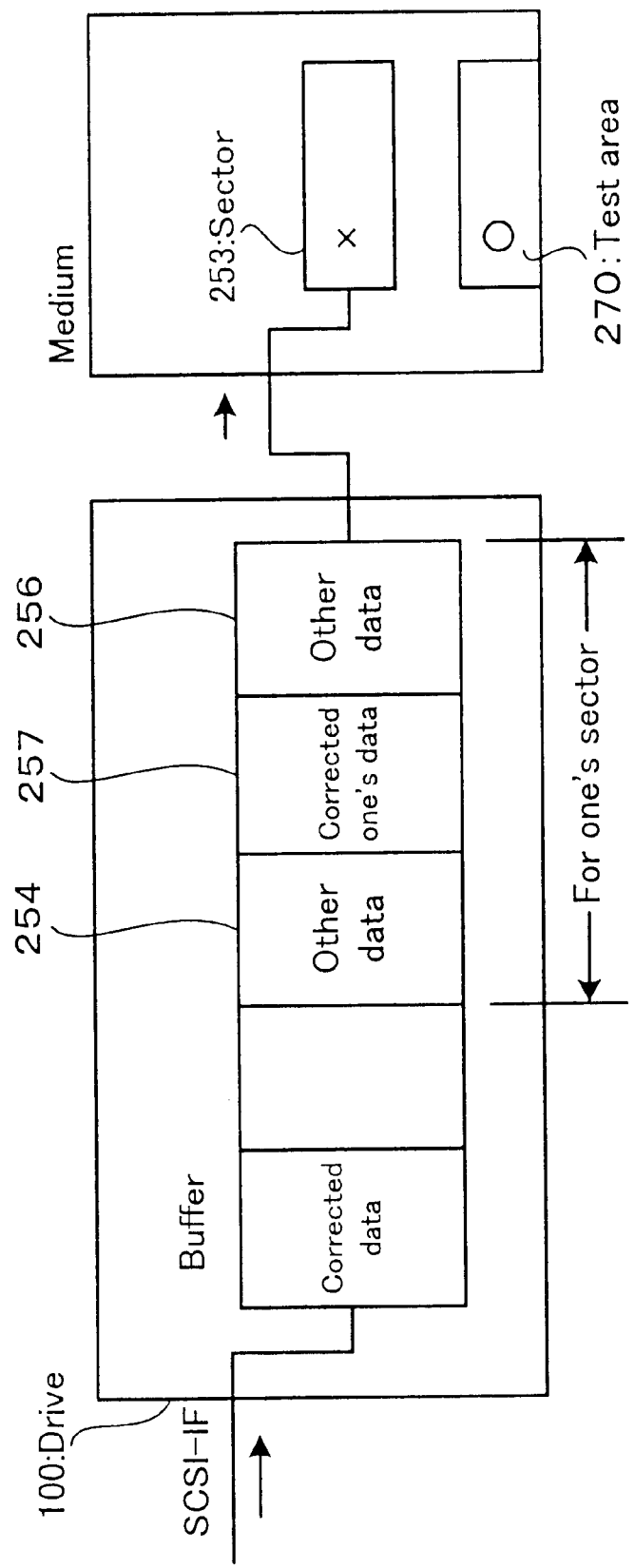
FIG. 17 is a diagram showing a third countermeasure with respect to data disappearance.

FIG. 17 is a diagram showing a third countermeasure against the data disappearance.

The third countermeasure is a countermeasure obtained by further improving the second countermeasure, and comprises recording the member information 254, 257, 256 for a plurality of persons to be recorded in the N-th sector 253 instead of the aforementioned test data in carrying out the write-in test with respect to the test area 270. Therefore, when the drive 100 fails in recording the information in the N-th sector 253, the necessary information has already been turned aside.

The second and third countermeasures are effective even when the volatile memory is employed as the data buffer, but by using these countermeasures together with the first countermeasure, the data disappearance is more securely avoided.

Figure 18:
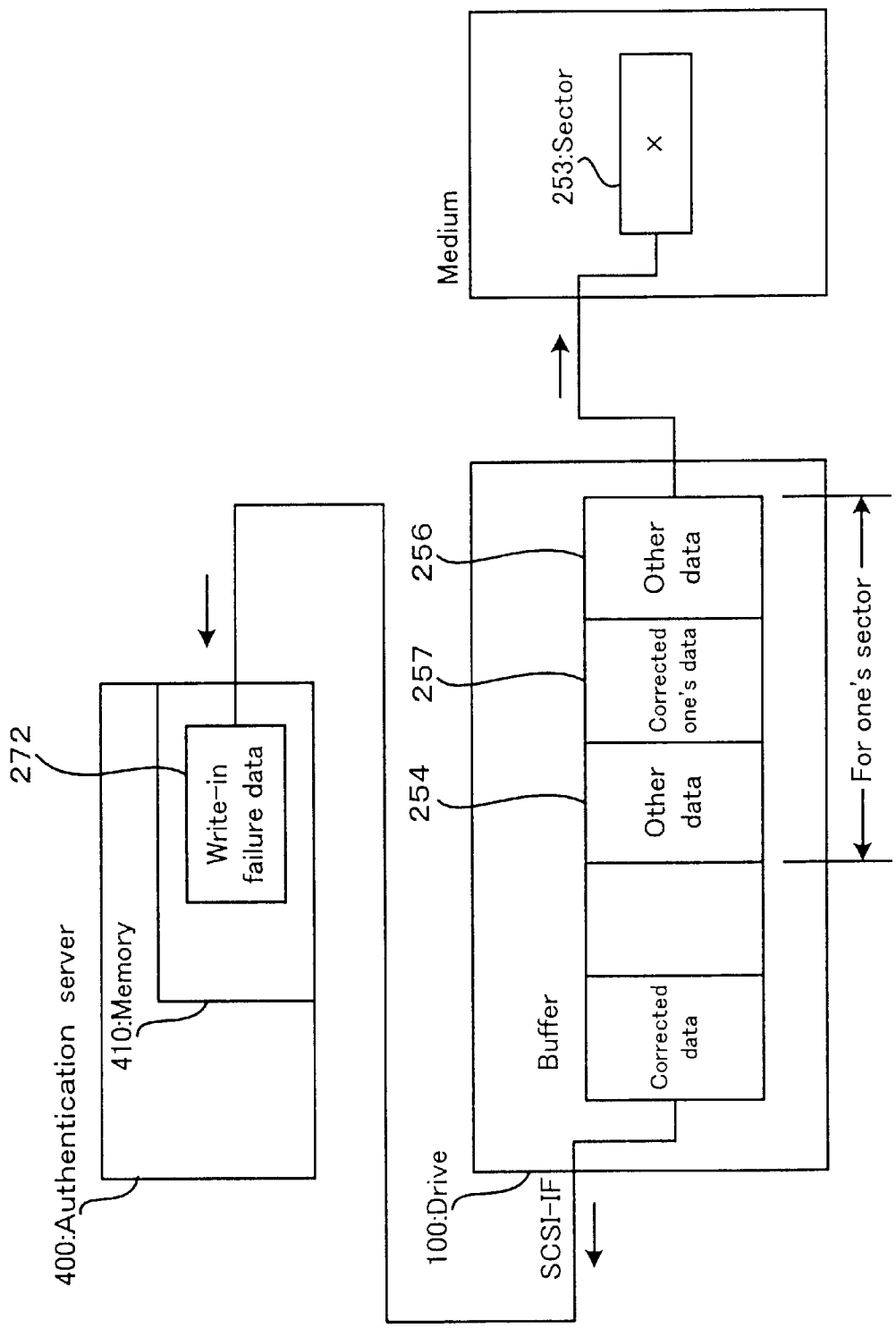
FIG. 18 is a diagram showing a fourth countermeasure with respect to data disappearance.

FIG. 18 is a diagram showing a fourth countermeasure against the data disappearance.

In this fourth countermeasure, when the drive 100 fails in recording the information in the N-th sector 253, write-in failure data 272 constituted of the member information 254, 257, 256 for a plurality of persons which fail to be recorded is outputted to the authentication server 400, and turned aside into the incorporated memory 410 of the authentication server 400.

Moreover, as a fifth countermeasure, when the drive 100 fails in recording the information in the information storage medium 200, for example, it is proposed to urge replacement of the information storage medium, and turn aside the information to another information storage medium different from the information storage medium 200. Here, it is judged whether or not the medium is replaced with another information storage medium, for example, by using a medium identification number stored in the special area 22 shown in FIG. 22, and the like as described above.

Additionally, when the information recording apparatus of the present invention is subjected to the first to fourth countermeasures, the data remaining on the nonvolatile memory, the data turned aside into another sector, and the like are preferably rewritten in the sector or the medium replacing the sector or the medium having failed in writing-in, for example, during restarting or retrying. By rewriting the data in this manner, the failure of information recording is restored, and the authentication server can utilize the rewritten data similarly as the data before the failure of information recording.

Figure 19:
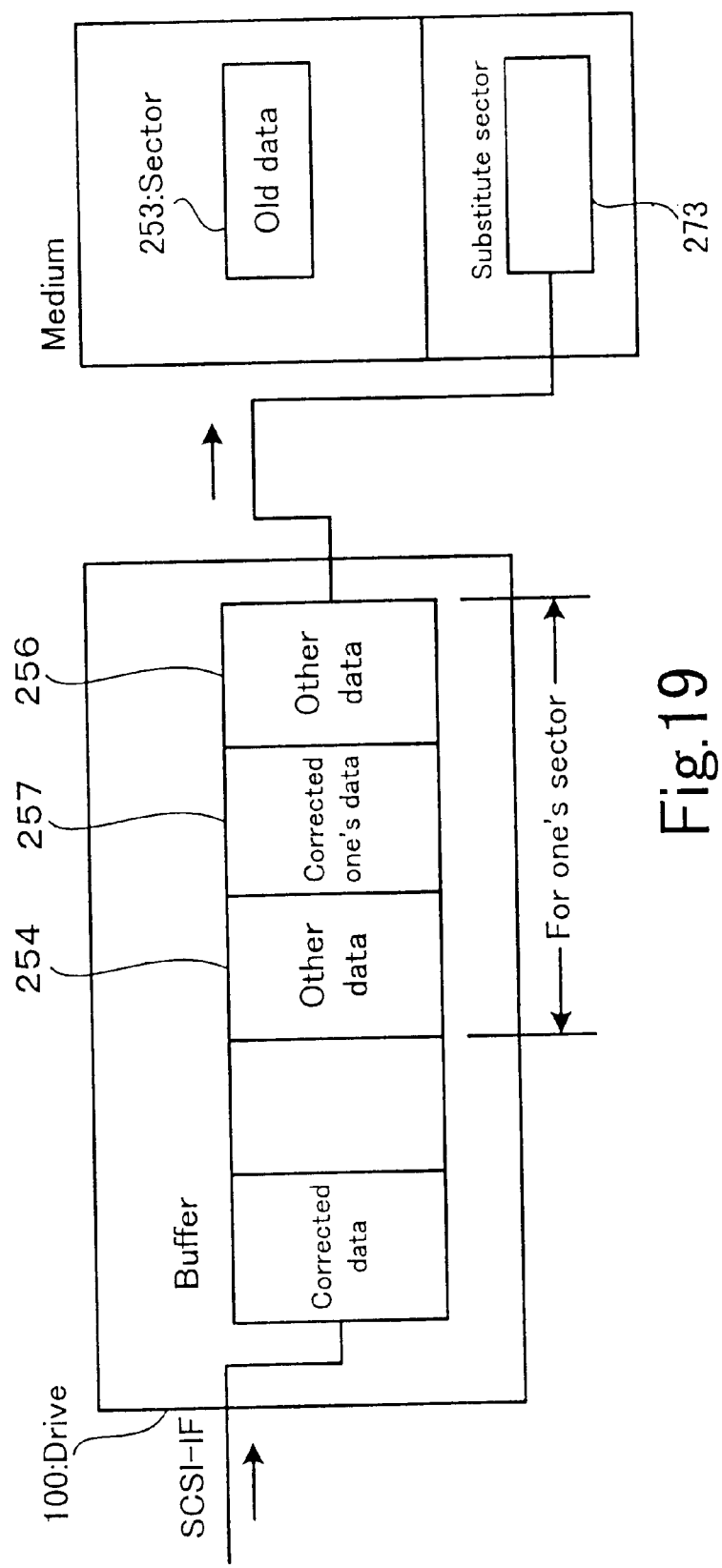
FIG. 19 is a diagram showing a fifth countermeasure with respect to data disappearance.

FIG. 19 is a diagram showing the fifth countermeasure against the data disappearance.

In general, the information storage medium is provided with a substitute sector which is utilized instead of the sector similarly as the sector when the sector is destroyed.

In the fifth countermeasure, the member information 254, 257, 256 for a plurality of persons to be recorded are recorded beforehand in a substitute sector 273 for the N-th sector 253 in which the information is to be recorded. Moreover, when the drive 100 fails in recording the information in the N-th sector 253, the substitute sector 273 is used instead of the N-th sector 253. Thereby, a trouble of rewriting the turned-aside data anew becomes unnecessary.

Additionally, the drive 100 is an apparatus similar to the magnetooptic disk drive 10 shown in FIG. 1, but as described above, the magnetooptic disk drive 10 is also provided with the volatile memory 15 in addition to the aforementioned nonvolatile memory 16 as the data buffer. These volatile memory 15 and nonvolatile memory 16 are selectively used as described later.

Figure 20:
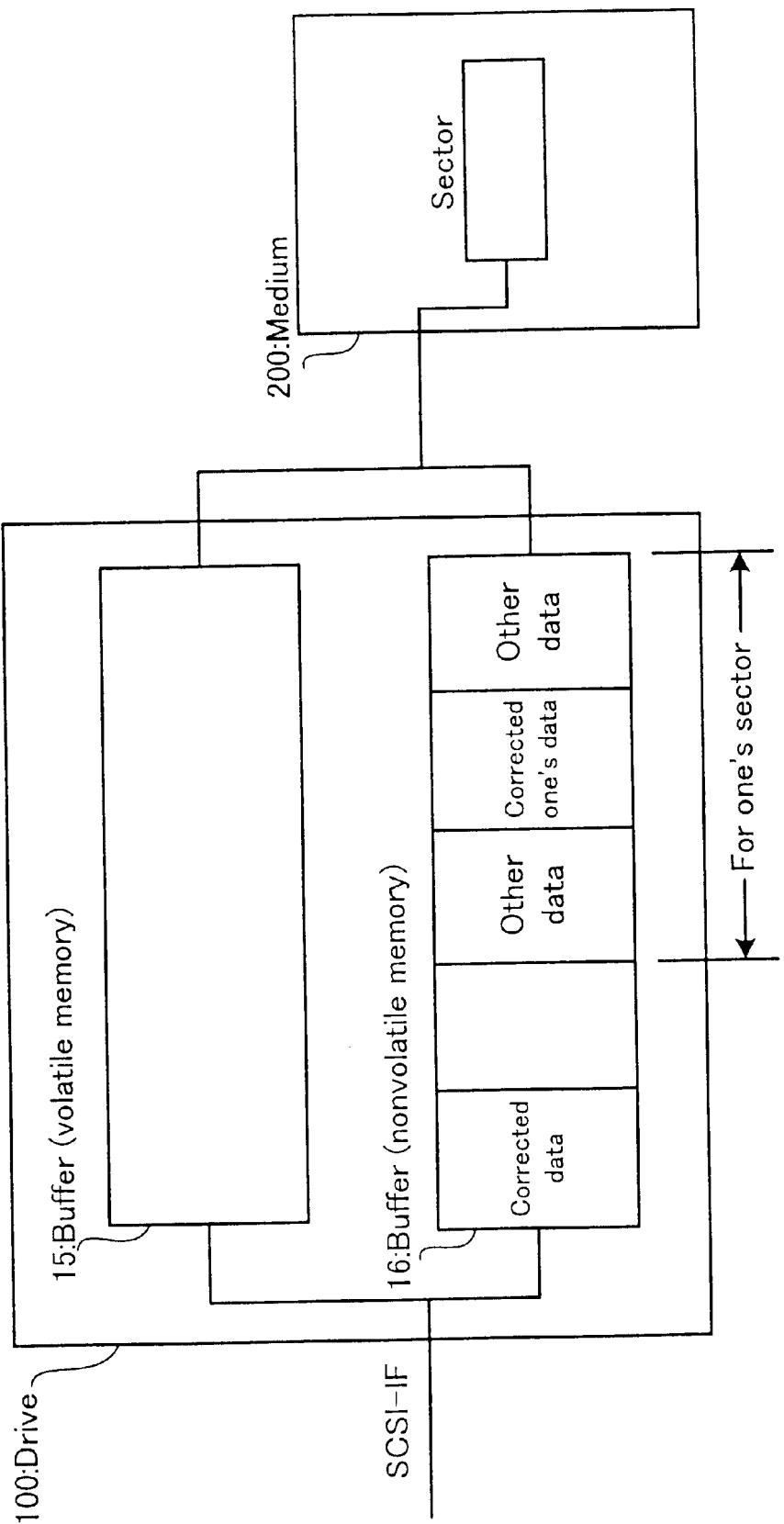
FIG. 20 is a diagram showing that a nonvolatile memory and a volatile memory are selectively used.

FIG. 20 is a diagram showing that the nonvolatile memory and volatile memory are selectively used.

When it is requested by the authentication server to perform reproducing or recording of the information with the information amount different from the sector unit with respect to the information storage medium 200, as described above, in order to prevent the data disappearance, the drive 100 uses the nonvolatile memory 16 as the data buffer. However, when the authentication server requests the information reproducing or information recording by the sector unit similarly as the conventional art, usually data backup or the like is already performed on an authentication server side, and the drive 100 therefore uses the volatile memory 15 larger in capacity and higher in speed than the nonvolatile memory 16 as the data buffer.

By selectively using the volatile memory 15 and nonvolatile memory 16 in this manner, the data disappearance is prevented, and the information reproducing and recording are performed at a high speed.

Additionally, the information recording apparatus of the present invention may usually use the volatile memory as the data buffer, and turn aside the information into the nonvolatile memory at the failure of information recording.

When data correction is instructed from the host computer, the aforementioned drive actually rewrites the data on the information storage medium. On the other hand, a write-once information recording apparatus has been heretofore known in which when the host computer instructs the data correction, the data before correction is left on the information storage medium, the corrected data is written in a new area, and the original data is usually hidden against the host computer. The write-once information recording apparatus is a useful apparatus because a data correction history is always left on the information storage medium and data restoration can therefore be performed by tracing the history as occasion demands. Additionally, in the conventional art, when the write-once information recording apparatus writes the corrected data in the new area, even for correction of a small amount of data, the new area is prepared by the sector unit, and there is a problem that the storage capacity of the information storage medium is wasted.

Therefore, in order to solve the problem, an embodiment for operating the information recording apparatus of the present invention as if it were the write-once information recording apparatus will be proposed hereinafter. In the following, the information recording apparatus operating as if it were the write-once information recording apparatus will be referred to simply as "write-once drive". According to the write-once drive, the storage capacity of the information storage medium can effectively be used. Since the hardware constitution of the write-once drive is the same as the hardware constitution of the magnetooptic disk drive 10 shown in FIG. 1, redundant description is omitted. Moreover, in the following description, components equivalent to those described with reference to FIGS. 8 to 20 are denoted with the same reference numerals, and the redundant description is omitted.

Figure 21:
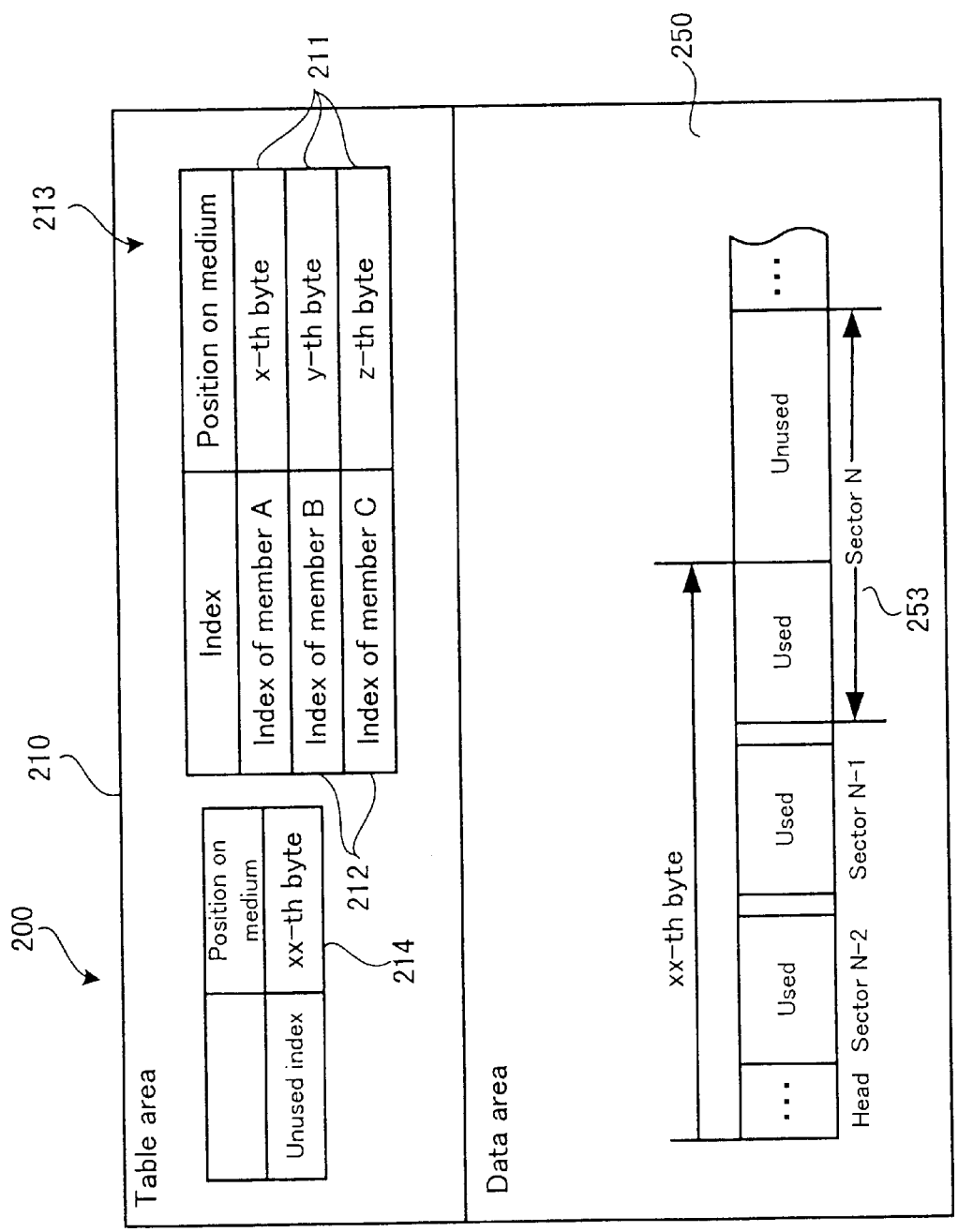
FIG. 21 is a diagram showing a structure of the storage area of the information storage medium in which the information is recorded by a write-once drive.

FIG. 21 is a diagram showing a structure of the storage area of the information storage medium in which the information is recorded by the write-once drive.

In the data area 250 of the information storage medium 200, data is recorded in order from the head.

Moreover, in the table area 210 of the information storage medium 200, in addition to the table 213 in which the position information 211 and member index 212 are associated with each other for each member, end information 214 indicating an end of the used area in the data area 250 (head of an unused area) is also stored.

Additionally, the "used area" does not mean an area in which the data is physically written, but means an area in which the host computer (authentication server) is used as a recording place of information for instructing the information recording. Specifically, for the information recorded in the sector, the area in which the information added to perform the information recording by the sector unit and indicating "blank" is recorded is the "unused area".

Here, it is assumed that xx-th byte counted from the head of the data area 250 is already used. Moreover, the position of the xx-th byte counted from the head exists on the N-th sector 253.

Figure 22:
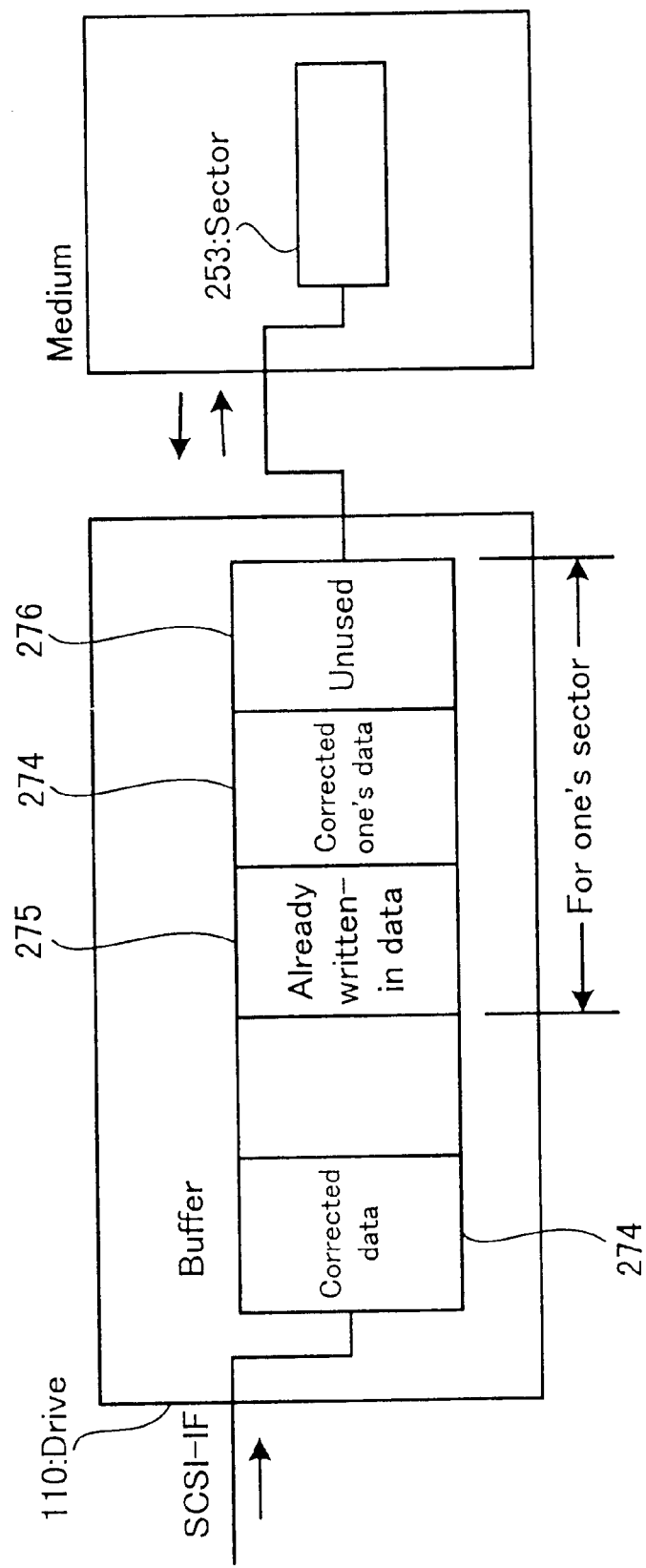
FIG. 22 is a diagram showing that the corrected member information is recorded by the write-once drive.

FIG. 22 is a diagram showing that the corrected member information is recorded by the write-once drive.

A drive 110 shown in FIG. 22 is the write-once drive, and is incorporated in the service presenting system similarly as the drive 100 shown in FIG. 7. Moreover, the drive 110 shown in FIG. 22 receives corrected data 274 from the host computer (authentication server), and records the corrected data 274 in the information storage medium 200.

On receiving the corrected data 274, the drive 110 reproduces the information for one sector from the N-th sector 253 including the end (the xx-th byte from the head) of the used area indicated by the end information 214 of FIG. 21 irrespective of the position in which the original member information corresponding to the corrected data 274 is recorded. For the information for one sector reproduced by the drive 110, information 275 reproduced on and before the xx-th byte from the head is information recognized by the authentication server as the information which has already been recorded.

Furthermore, the information reproduced from the area following the xx-th byte from the head and indicating "blank" is replaced with the corrected data 274. After the replaced corrected data 274 shown in FIG. 22, information 276 indicating "blank" remains, and an area in which the information 276 is to be recorded is an unused area even after recording.

In this manner, the information 275, 274, 276 for one sector partially replaced with the corrected data 274 are recorded in the N-th sector 253, the end information 214 of FIG. 21 is updated to indicate the end of the corrected member information 274, and further the position information 211 stored in the table 213 is also rewritten. As a result, it is seen from the apparatus (authentication server) as if the member information on the information storage medium 200 were rewritten.

Even in the write-once drive 110, similarly as described above with reference to FIG. 15 or the like, there is a possibility that data disappearance occurs at the failure of data recording. Therefore, the write-once drive 110 is also preferably subjected to the countermeasure against the data disappearance. As described above, the hardware constitution in the write-once drive 110 is the same as the hardware constitution shown in FIG. 1, and as the first countermeasure against the data disappearance, the nonvolatile memory is employed in the data buffer.

Figure 23:
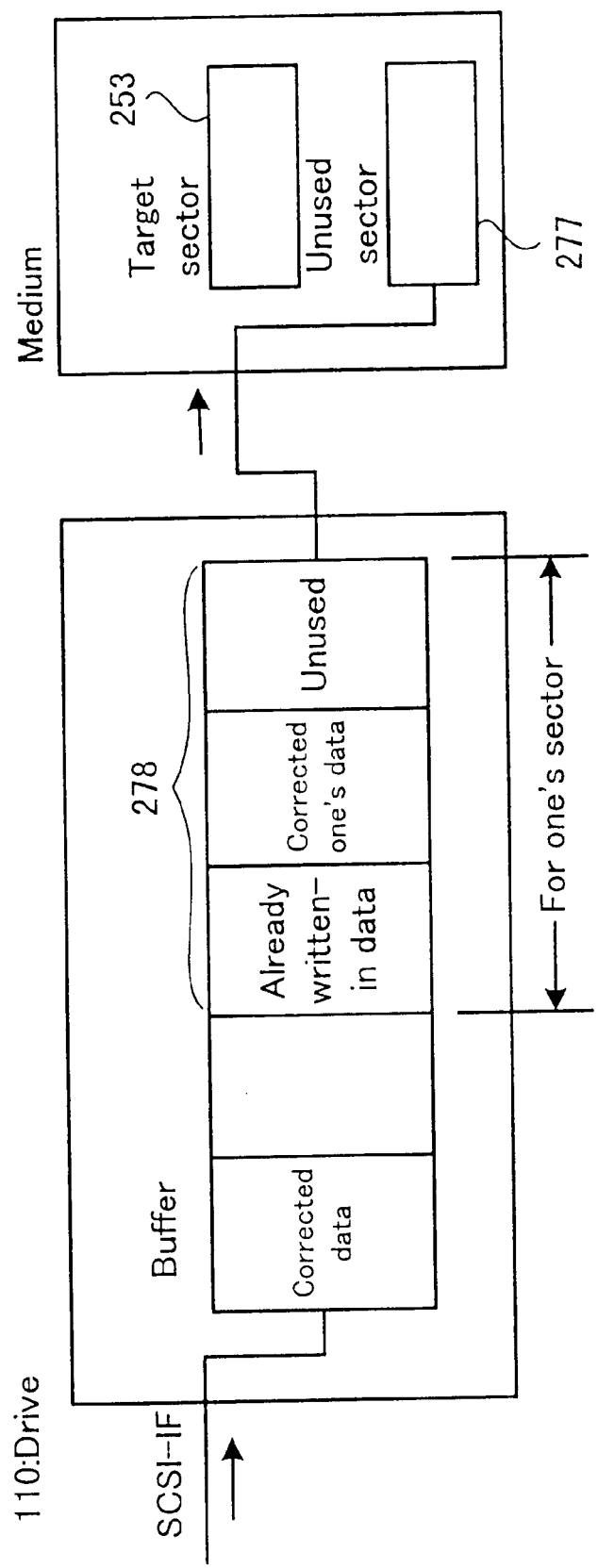
FIG. 23 is a diagram showing the second countermeasure with respect to data disappearance in the write-once drive.

FIG. 23 is a diagram showing the second countermeasure against the data disappearance in the write-once drive.

In the second countermeasure, before performing the information recording on the target sector 253 in which the information for one sector is to be recorded, an information recording test is carried out with respect to an unused sector 277 which is the next sector of the target sector 253. Furthermore, when the drive 110 fails in recording the information in the target sector 253, information 278 for one sector scheduled to be recorded in the target sector 253 is turned aside into the unused sector 277. This avoids the information disappearance.

Figure 24:
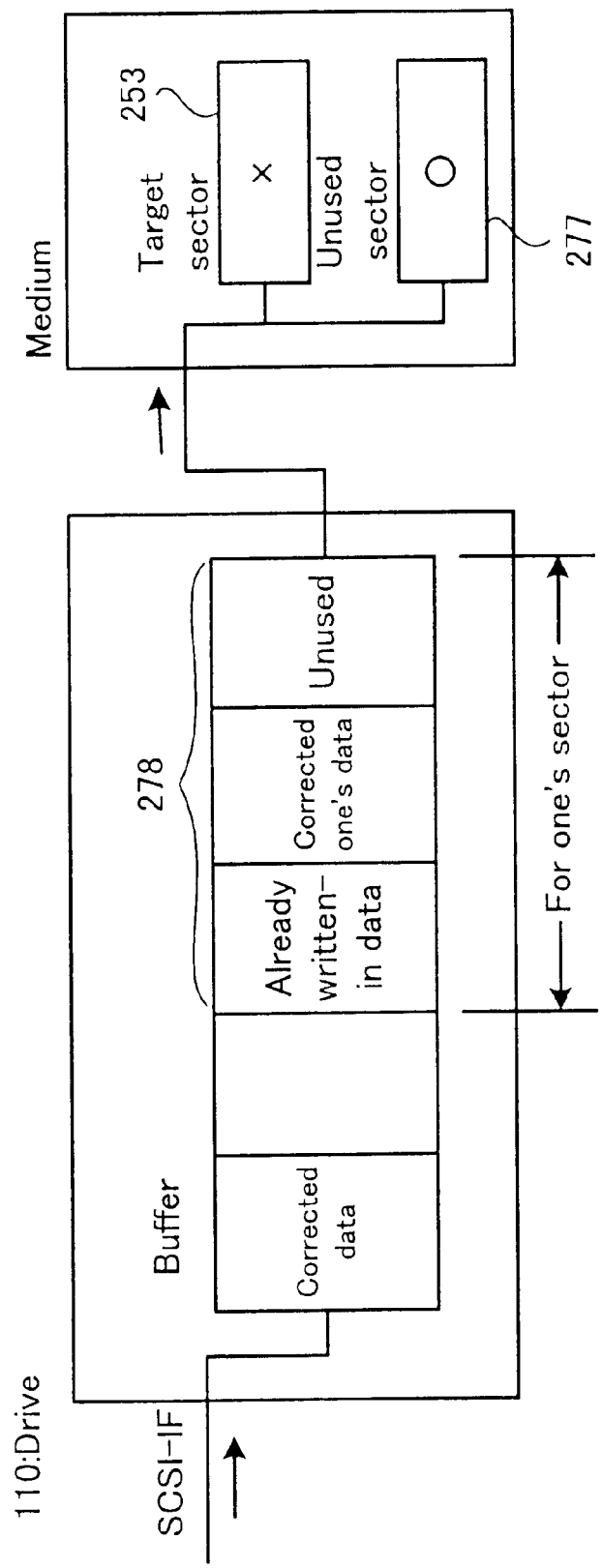
FIG. 24 is a diagram showing the third countermeasure with respect to data disappearance in the write-once drive.

FIG. 24 is a diagram showing the third countermeasure against the data disappearance in the write-once drive.

In the third countermeasure, before the information recording on the target sector 253, the information 278 for one sector to be recorded in the target sector 253 is recorded in the unused sector 277, and subsequently the information recording is performed on the target sector 253. Moreover, when the drive 110 fails in recording the information in the target sector 253, the target sector 253 is discarded, and the unused sector 277 is used instead of the target sector 253. Therefore, even when the drive 110 fails in recording the information, the processing can be continued without allowing the host computer to recognize the failure of information recording.

Additionally, when the drive 110 succeeds in the information recording, the information recording in the unused sector 277 is ignored.

By applying this countermeasure, the security of the information in the drive 110 is enhanced.

In the aforementioned respective embodiments, the information is replaced on the data buffer 16 to generate the information of the sector unit and subsequently the information of the sector unit is recorded, but the information replacement section of the present invention may replace the information while the recording section is recording the information.

Moreover, in the aforementioned embodiments, the magnetooptic disk of an optical recording system is used as the information storage medium, but the information storage mediums referred to in the present invention may be magnetooptic disks of respective recording systems such as a magnetooptic recording system, phase change recording system, and magnetic recording system, other disk-type storage mediums such as an optical disk and magnetic disk, or card or tape type storage mediums.

As described above, according to the present invention, the information transfer is possible by the information amount unit different from the sector unit, and as a result, it is possible to lighten a burden on the host computer, avoid waste of a transfer time, and to raise the information protection level.

What is claimed is:

1. An information reproducing apparatus for reproducing information from an information storage medium in which a storage area is divided into physical sectors as minimum units for performing information recording and information reproducing, said apparatus comprising:

an information designating reception section in which non-sector unit information constituted by a non-sector unit configured for storing an information amount different from an integer times one of the minimum units is designated as the information to be reproduced from said information storage medium;

a reproducing section for reproducing the information for the integer number of sectors including the non-sector unit information designated by said information designating reception section from said information storage medium; and an output section for extracting and outputting the non-sector unit information designated by said information designating reception section from the information for the integer number of sectors reproduced by said reproducing section.

2. The information reproducing apparatus according to claim 1 wherein said information designating reception section designates security information constituted by said non-sector unit as the information to be reproduced from said information storage medium.

3. An information recording apparatus for recording information in an information storage medium in which a storage area is divided into physical sectors as minimum units for performing information recording and information reproducing, said apparatus comprising:

an information reception section in which non-sector unit information constituted by a non-sector unit configured for storing an information amount different from an integer times one of the minimum units is received as the information to be recorded in said information storage medium;

a reproducing section for reproducing the information for the integer number of sectors stored in the areas for the integer number of sectors including a recording area in which the non-sector unit information received by said information reception section is recorded on said information storage medium;

an information replacement section for replacing the information reproduced from said recording area among the information for the integer number of sectors reproduced by said reproducing section with the non-sector unit information received by said information reception section; and a recording section for recording the information for the integer number of sectors partially replaced by said information replacement section in the areas for the integer number of sectors in which the information is reproduced by said reproducing section.

4. The information recording apparatus according to claim 3 wherein said information reception section receives security information constituted by said non-sector unit as the information to be recorded in said information storage medium.

5. The information recording apparatus according to claim 3, further comprising a nonvolatile memory for storing the information for the integer number of sectors to be recorded by said recording section.

6. The information recording apparatus according to claim 3 wherein said information reception section receives each of said non-sector unit information and sector unit information constituted by the sector unit of the information amount for one sector as the information to be recorded in said information storage medium, and the information recording apparatus further comprises: a nonvolatile memory for storing the information for the integer number of sectors when said information reception section receives said non-sector unit information, and the information for the integer number of sectors including the non-sector unit information is recorded in said information storage medium; and a volatile memory for storing the sector unit information when said information reception section receives said sector unit information, and the sector unit information is recorded in said information storage medium.

7. The information recording apparatus according to claim 3 wherein when said recording section fails in recording the information in a certain sector, the information is recorded in another sector different from the certain sector.

8. The information recording apparatus according to claim 7 wherein before recording the information in the certain sector, said recording section carries out an information recording test on another sector different from the certain sector beforehand.

9. The information recording apparatus according to claim 3 wherein before recording the information in a certain sector, said recording section records the information in another sector different from the certain sector beforehand.

10. The information recording apparatus according to claim 3 wherein when said recording section fails in recording the information in a certain information storage medium, the information is recorded in another information storage medium different from the certain information storage medium.

11. The information recording apparatus according to claim 3, further comprising a nonvolatile memory for storing the information when said recording section fails in recording the information in said information storage medium.

12. The information recording apparatus according to claim 3, further comprising an output section for outputting the information to the outside of the information recording apparatus when said recording section fails in recording the information in said information storage medium.

13. The information recording apparatus according to claim 3, further comprising an area designation section for designating an area, as the area for recording the non-sector unit information received by said information reception section on said information storage medium, following an end of the latest information received by the information reception section and recorded on the information storage medium before the non-sector unit information, wherein said reproducing section reproduces the information for the integer number of sectors stored in the areas for the integer number of sectors including the area designated by said area designation section, and said replacement section replaces the information reproduced from the area designated by said area designation section among the information for the integer number of sectors reproduced by said reproducing section with the non-sector unit information received by said information reception section.

* * * * *